United States Patent [19]

Jones et al.

[11] 4,258,809
[45] Mar. 31, 1981

[54] APPARATUS AND METHODS FOR WEIGHING RAILROAD CARS COUPLED TOGETHER AND IN MOTION

[75] Inventors: William F. Jones, Glenview, Ill.

[73] Assignee: Mangood Corporation, Chicago, Ill.

[21] Appl. No.: 493,218

[22] Filed: Jul. 31, 1974

[51] Int. Cl.³ .................. G01G 9/00; G01G 19/40; G01G 21/22
[52] U.S. Cl. ........................... 177/1; 177/15; 177/25; 177/163
[58] Field of Search .............. 177/134, 163, DIG. 8; 275/92 TC, 151.33; 246/77, 247

[56] References Cited

U.S. PATENT DOCUMENTS

| | | | |
|---|---|---|---|
| 2,806,685 | 9/1957 | Vande Sande et al. | 177/10 |
| 3,063,635 | 11/1962 | Gordon | 177/163 |
| 3,374,844 | 3/1968 | Rogers | 177/134 |
| 3,439,524 | 4/1969 | Rogers | 177/211 |
| 3,556,236 | 1/1971 | Cort | 177/163 |
| 3,646,328 | 2/1972 | Tonies | 177/DIG. 8 |
| 3,721,820 | 3/1973 | Caulier | 177/163 |
| 3,825,734 | 7/1974 | Jacobs et al. | 177/25 X |
| 3,842,922 | 10/1974 | Fagin et al. | 177/134 |

FOREIGN PATENT DOCUMENTS 1221743  2/1971  United Kingdom .................. 177/211

*Primary Examiner*—Vit W. Miska
*Attorney, Agent, or Firm*—George H. Gerstman

[57] ABSTRACT

An apparatus and method for weighing railroad cars coupled together and in motion is disclosed which eliminates the necessity for special scales and, in particular, can be retrofitted and used in conjunction with most existing weigh bridges regardless of the length of the weight bridge, without any modification of the physical construction thereof, and with most existing weigh mechanisms.

Generally, the apparatus provides two types of weighing, summation of axle weights and full draft. In addition, combinations of each are possible. During weighing by the summation of axle weights, as each axle enters the weigh bridge, a weight measurement is made and stored in memory. Cars with up to a maximum of nine axles (this is limited by the requirement rather than the electronics) are weighed by adding the axle weights, when the last car axle has entered the weigh bridge. A printer provides a hard copy record of car weights. Full draft weights can be provided, on weigh bridges longer than cars, to provide a more accurate individual car weight. Each axle on the weigh bridge has its equivalent weight stored in memory and during a full draft weight cycle, all axles other than those of the car in full weight draft are subtracted from the current weight. The final weight is passed to the printer to provide a hard copy record. The axle sum or full draft weight cycles are automatically carried out by signals generated from the track switch logic. The computing unit accepts trains containing cars which may be weighed on axle sum or full draft, depending on the car axle spacing and the weigh bridge length.

51 Claims, 16 Drawing Figures

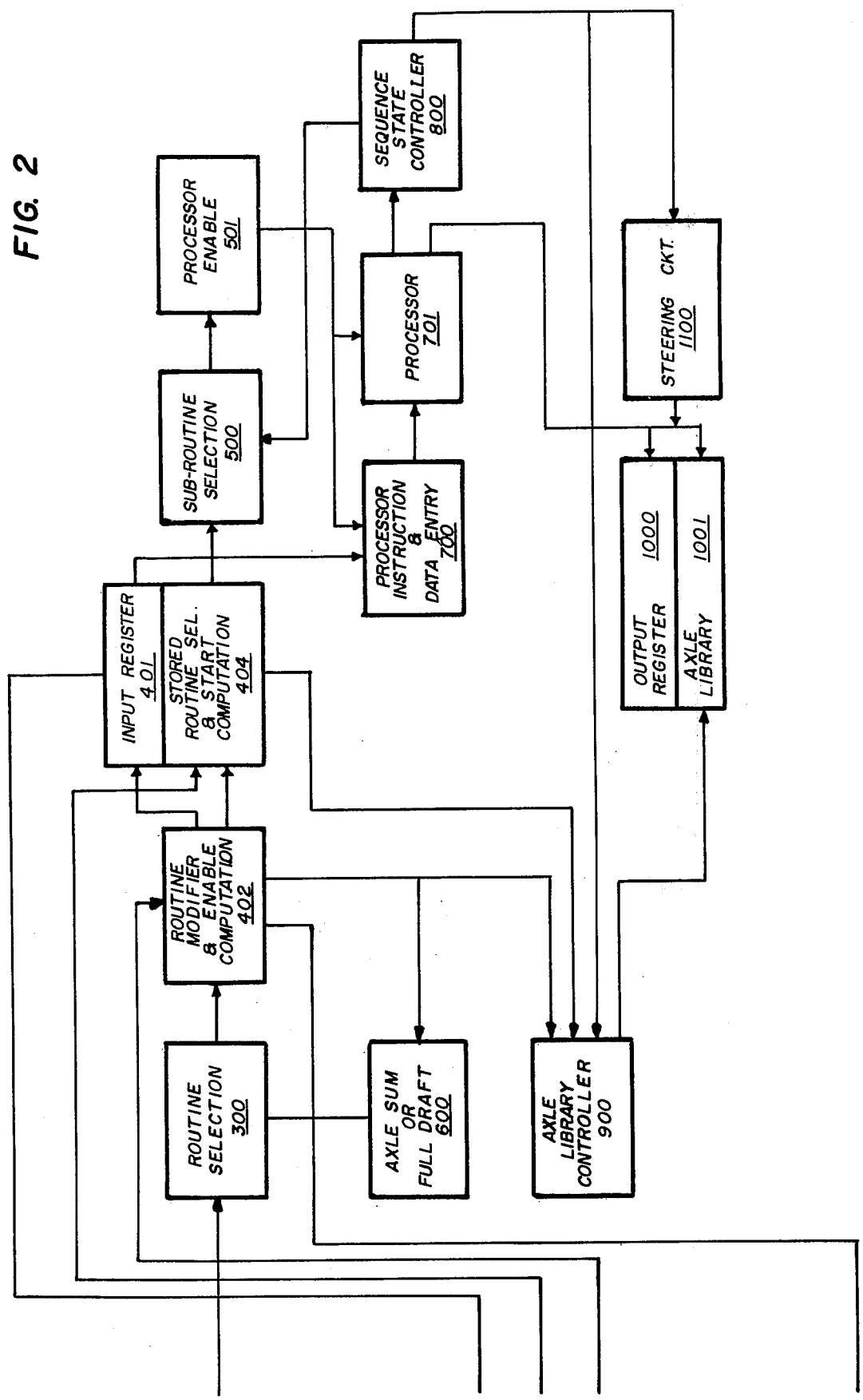

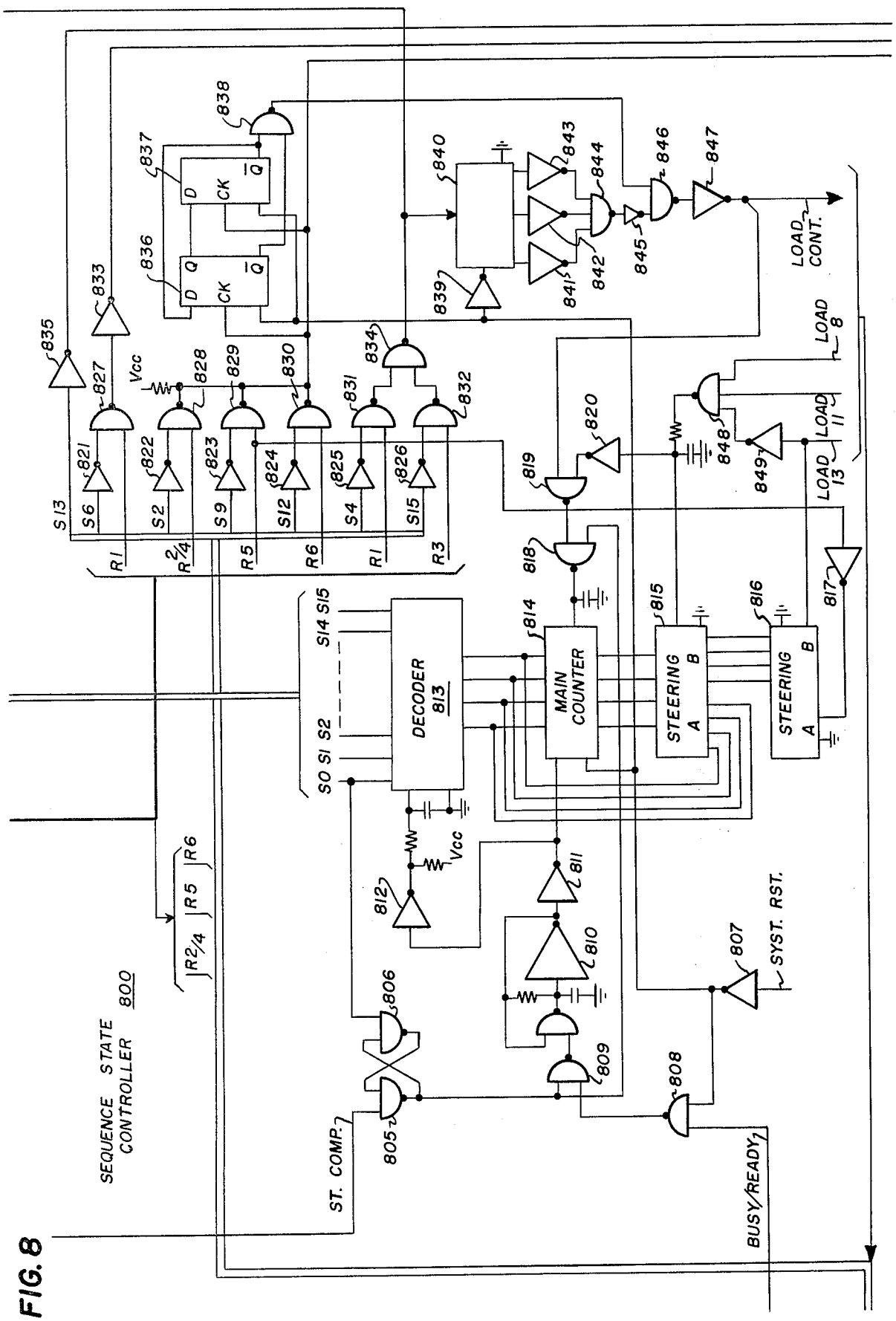

AXLE LIBRARY CONTROLLER 900

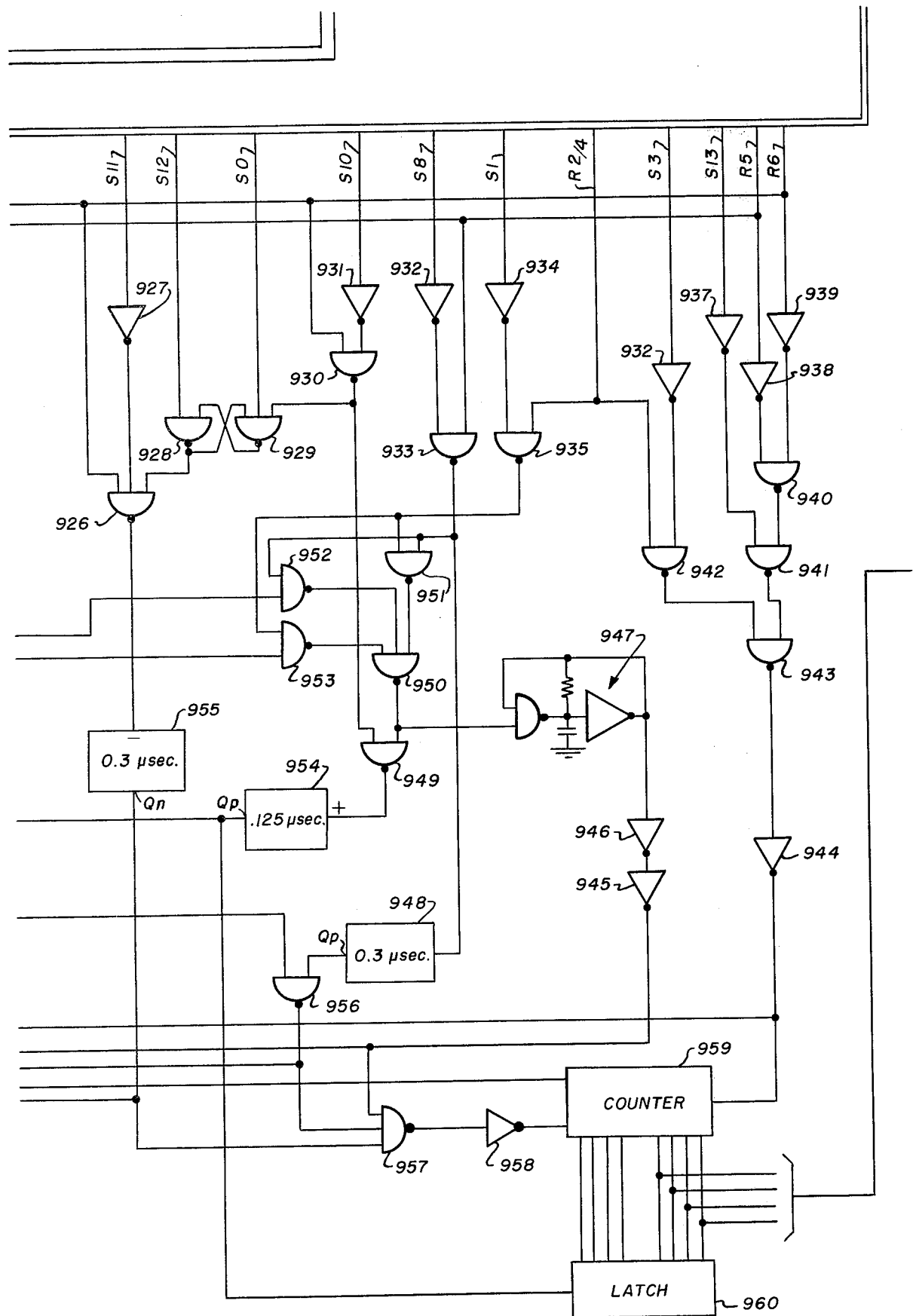
FIG. 9B    900

APPARATUS AND METHODS FOR WEIGHING RAILROAD CARS COUPLED TOGETHER AND IN MOTION

BACKGROUND OF THE INVENTION

This invention relates to improved apparatus and methods for weighing rolling stock, particularly railroad cars, in motion. More particularly, it relates to improved apparatus and methods for weighing in motion rolling stock, by weighing each axle as it enters a weigh bridge. More particularly still, it relates to improved apparatus and methods which can be retrofitted and used in conjunction with most existing weigh bridges regardless of the length of the weigh bridge, to weigh in motion rolling stock, by weighing each axle as it enters the weigh bridge.

FIELD OF THE INVENTION

Freight cars are frequently weighed in motion while they are coupled together in a train, with the weighing normally being performed by separately weighing the individual axles or the individual trucks, each car normally having only two trucks, and by adding together the weight of all of the axles or the two trucks to provide the weight of the car.

In the past, with most if not all prior systems, when weighing each axle of a car, the limiting factor in determining the maximum length of the weigh rail is the axle spacing between the two axles of any truck. When weighing the individual trucks of a car, the limiting factor in determining the maximum length of the weigh rail is the length of a truck plus the distance between trucks of adjacent cars. Accordingly, the weigh rails normally are approximately 5 feet in length in the case where individual axles are weighed, and 12 feet 6 inches in those cases where individual trucks are weighed. Some systems employ a single draft operation, in which case the maximum length of the weigh rail is limited to the length of a car plus the distance between adjacent cars, while the minimum length is the length of a car. In this latter case, it is apparent that all of the cars must be of substantially the same length, and the weigh rail must be of a length suited for that length of car.

Since railroad cars are of varying lengths, with wheel bases from approximately 25 to approximately 86 feet, and the weight rails of many existing weigh bridges generally range from 40 to 70 feet in length, with some being as long as 110 feet in length, these weigh bridges cannot be used for multiple draft weighing of cars coupled and in motion, by any of these methods of weighing the individual axles, the individual trucks, or single draft weighing of an entire car. The apparatus and method of the present invention can be used in conjunction with new installation and can be retrofitted with most if not all existing weigh bridges, regardless of the length of the weigh rail thereof.

SUMMARY OF THE INVENTION

More particularly, the improved apparatus and methods of the present invention eliminates the necessity for special scales and, in particular, can be retrofitted and used in conjunction with most existing weigh bridges regardless of the length of the weigh bridge, without any modification of the physical construction thereof, and with most existing weigh mechanisms. In new installations, shorter weigh bridges including weigh bridges as short as approximately 5 feet in length can be used so that not only many economies in original cost and cost of maintenance and operation are obtained, but much greater flexibility in the length and weight of car that can be weighed on the weigh bridge. A new "computing unit", this term being used to encompass the various electronic logic and control circuits associated with the track logic and weigh apparatus, is provided to allow more flexible usage of the in motion weighing system, by weighing each axle as it enters the weigh bridge, rather than weighing each truck.

Generally, the system provides two types of weighing, summation of axle weights and full draft. In addition, combinations of each are possible. During weighing by the summation of axle weights, as each axle enters the weigh bridge, a four decimal digit axle weight measurement is made and stored in memory. Cars with up to a maximum of nine axles (this is limited by the requirement rather than the electronics) are weighed by adding the axle weights, when the last car axle has entered the weigh bridge. A printer provides a hard copy record of car weights. Full draft weights can be provided, on weigh bridges longer than cars, to provide a more accurate individual car weight. Each axle on the weigh bridge has its equivalent weight stored in memory and during a full draft weight cycle, all axles other than those of the car in full draft are subtracted from the current weight. The final weight is passed to the printer to provide a hard copy record. The axle sum or full draft weight cycles are automatically carried out by signals generated from the track switch logic. The computing unit accepts trains containing cars which may be weighed on axle sum or full draft, depending on the car axle spacing and the weigh bridge length.

The track logic provides signals to the computing unit by interpreting the sequence of operation of the track switches. Besides providing the normal signals associated with entry or exit of axles from the weigh bridge, the track logic provides a "last axle" signal. A check of axles on the weigh bridge is made by using the entry and exit signals and, from this, a car in full draft can be recognized by the computing unit.

The computing unit accepts a five digit BCD number from the current weight counter and signals from the track logic and outputs a five digit BCD number to the printer. Current weight is transferred to a "current weight register" at the end of a weigh cycle. A new weigh cycle may be started immediately while the processor calculates axle weights, etc. The computing unit then enters a routine, depending on the track logic signals. These routines and the mode of operation of the system during each of these routines are described more specifically below.

Accordingly, it is an object of the present invention to provide an improved weighing system and method for weighing rolling stock, particularly railroad cars, in motion. A more particular object is to provide such an improved weighing system and method which can be retrofitted to most existing weigh bridges regardless of their lengths, without modifications to their physical constructions, or in new installations with any length weigh brdige exceeding a predetermined minimum length.

Still another object is to provide such a weigh system and method which can be retrofitted to an existing weigh bridge with minimum down time of the weigh bridge for retrofitting the same being required, particularly since the physical construction of the weigh bridge need not be modified.

Other objects of the invention will in part be obvious and will in part appear hereinafter.

BRIEF DESCRIPTION OF THE DRAWINGS

For a fuller understanding of the nature and objects of the invention, reference should be had to the following detailed description taken in connection with the accompanying drawings, in which:

FIGS. 1 and 2, and FIG. 1a, when assembled as illustrated in FIG. 12, are a diagrammatic representation of the system for weighing in motion objects as they move past a weigh station, with the track control portion, the track logic and weigh system thereof being illustrated in FIG. 1, or FIG. 1a, and the computing unit thereof being illustrated in FIG. 2;

FIG. 8 is a block diagram schematic of the sequence state controller;

FIGS. 9a and 9b are a block diagram schematic of the remaining portion of the axle library controller;

Similar reference characters refer to similar parts throughout the several views of the drawings.

GENERAL DESCRIPTION

Figure 1:
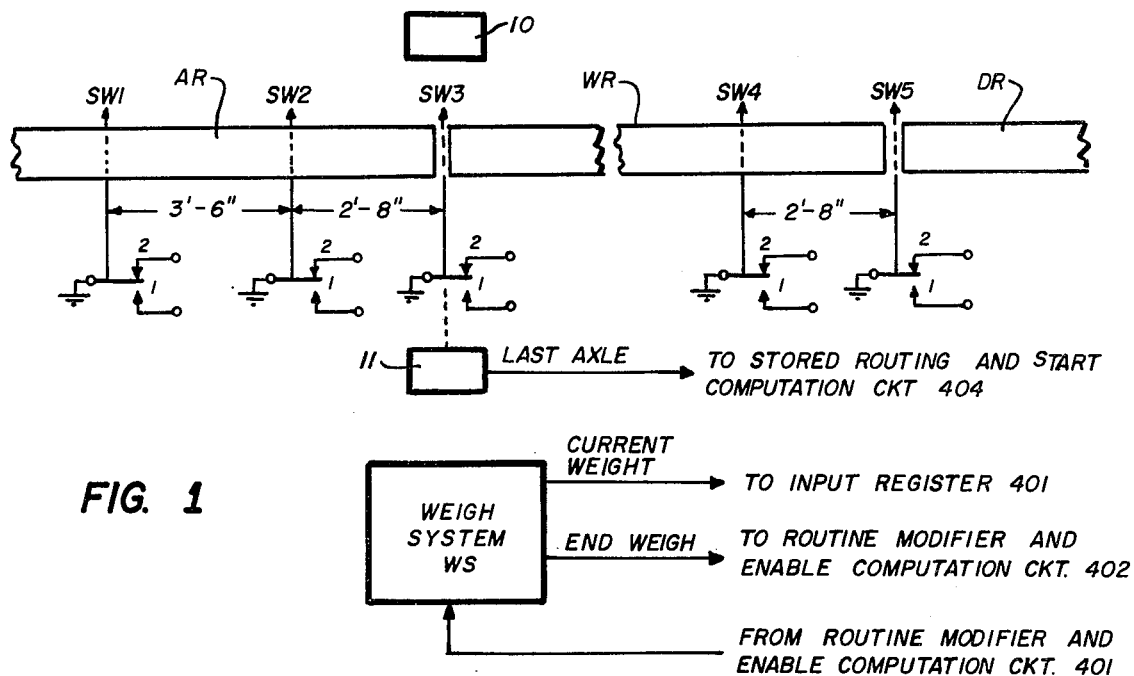
Figure 12:
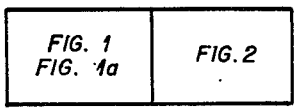
FIG. 12 is an illustration showing the relationships of FIGS. 1 and 2.

Referring now to the drawings, in FIG. 1 there is shown a section of railroad track at a weigh station, including approach rails AR, weigh rails WR and departure rails DR, together with track logic switches SW1–SW5 and weigh system WS.

The weigh rails WR constitute a weigh bridge and are separated from the approach rails AR and departure rails DR. The length of the weigh rails or bridge WR, as indicated above, is variable and can be of any length within a range of a practical minimum length of 12 feet 6 inches to and exceeding 110 feet in length. Therefore, most if not all existing weigh rails or bridges can be used with the apparatus of the present invention, for reasons which will be apparent from the description below.

The track logic, in the illustrated embodiment, comprise track logic switches SW1–SW5, however, any suitable means for detecting a wheel or axle and for providing an output signal in response to the detection of the same in the manner described below can be employed. These track logic switches SW1–SW5 are normally open, and are arranged to be closed temporarily by the rim (or flange) of the wheel of any axle rolling over the rail along side of which the switches are located. The track switch SW1 is located 6 feet 2 inches from the entrance to the weigh rails WR, track switch SW2 is located 2 feet 8 inches from the entrance gap to the weigh rails WR, track switch 3 is located on the entrance gap to the weigh rails WR, track switch SW4 is 2 feet 8 inches from the exit gap of the weigh rails WR and track switch SW5 is on the exit gap of the weigh rails WR. The maximum spacing between the track switches SW2 and SW3, and between track switches SW4 and SW5, is limited and is equal to one-half the minimum axle spacing between any two axles on a railroad car to be weighed on the weigh bridge WR. In the illustrated embodiment, these spacings are established at 2 feet 6 inches to provide sufficient time for the weigh system WS (described below) to complete a weigh cycle, with the railroad cars traveling at a maximum permissible speed of approximately 4.1 miles per hour, as explained more fully below. This spacing can be less, if the weigh system WS is capable of providing a weight output in less time. The spacing between track switches SW1 and SW2 is established at 3 feet 6 inches to provide a locomotive inhibit signal, as explained more fully below. The track switches SW are connected to the computing unit of FIG. 2, described more fully below, by various control conductors, for initiating a weigh cycle.

More particularly, a weigh cycle is initiated by the track switches SW which, depending upon the sequence of operation thereof, couple an appropriate signal or signals to a routine selection circuit 300 of the computing unit (FIG. 2). The routine selection circuit 300 in conjunction with a routine modifier and enable computation circuit 402, a store routine selection and start computation circuit 404, and a select axle sum or full draft circuit 600 establish a routine mode of operation. Signals representative of the selected routine are coupled to and through the routine modifier and enable computation circuit 402 to the stored routine selection and start computation circuit 404, to enable another weigh cycle to be initiated, with the first established routine being stored for use by the computing unit. The signal coupled to the routine modifier and enable computation circuit 402 operates the latter to couple a START WEIGH signal to the weigh system WS to initiate a weigh cycle described more particularly below.

At the end of a weigh cycle, an END WEIGH signal from the weigh system WS is coupled to the routine modifier and enable computation circuit 402 to now operate it and the stored routine selection and start computation circuit 404 to store the established routine in the latter. This END WEIGH signal also operates the routine modifier and enable computation circuit 402 to generate an ENABLE COMPUTATION signal which gates the stored routine into the sub-routine selection circuit 500 which then functions to provide coded output signals, during established sequence states generated by a sequence state controller 800, to the processor enable circuit 501 and the signal steering circuit 1100.

The processor enable circuit 501 functions to enable the processor 701 and the processor instruction and data entry circuit 700 to couple the weight stored in the input register 401 into the processor 701. The processor 701 functions to determine the weight of the axle which had entered onto the weigh rails WR at that time and, after doing so, transfers the weight into storage in the memory or axle library 1001, under the control of the axle library controller 900.

As indicated above, with the present system, two types of weighing, summation of axle weights and full draft, are provided. In addition, combinations of each are possible. The track switches SW provide signals to the routine selection circuit 300 including signals associated with entry and exit of axles from the weight rails WR. A LAST AXLE signal indicating the last axle of a car also can be provided. A check of axles on the weight rails WR is made by using the entry and exit signals, by the axle sum or full draft circuit 600. The latter circuit then functions to automatically initiate the axle sum or full draft weight cycles, by signals coupled to the routine modifier and enable computation circuit 402. As each axle enters the weight rails WR, an axle weight measurement is made and stored in the memory or axle library 1001. When the LAST AXLE signal is received, a car is weighed by adding the axle weights of that car, stored in the axle library 1001. During a full draft weigh cycle, all axles other than those of the car in full draft are subtracted from the current weight coupled into the processor 701, to provide the full draft weight of the car on the weigh rails WR.

The LAST AXLE signal can be generated by the track switches SW, in a manner more particularly described below, or in other known manners. For example, as indicated in FIG. 1, a source of light 10 can be located to impinge on a detector 11, and the same located with respect to the weigh bridge WR to detect the end of each railroad car entering upon the weigh bridge. Upon detecting the end of a car, a signal is generated corresponding to a LAST AXLE signal, indicating that the last axle of a railroad car has entered the weigh bridge.

The weight system WS can be of the present type used in existing weigh stations, for weighing and providing an output indication of the weight currently on the weigh bridge WR. A weigh cycle is initiated by a START WEIGH signal coupled to the weigh system WS from the routine modifier and enable computation circuit 402, and the latter upon completing the weigh cycle couples an END WEIGH signal back to the same circuit 402. The CURRENT WEIGH, that is, the weight determined to be on the weigh bridge WR during the weigh cycle is coupled to the input register 401 which forms a current weight register.

Figure 1A:
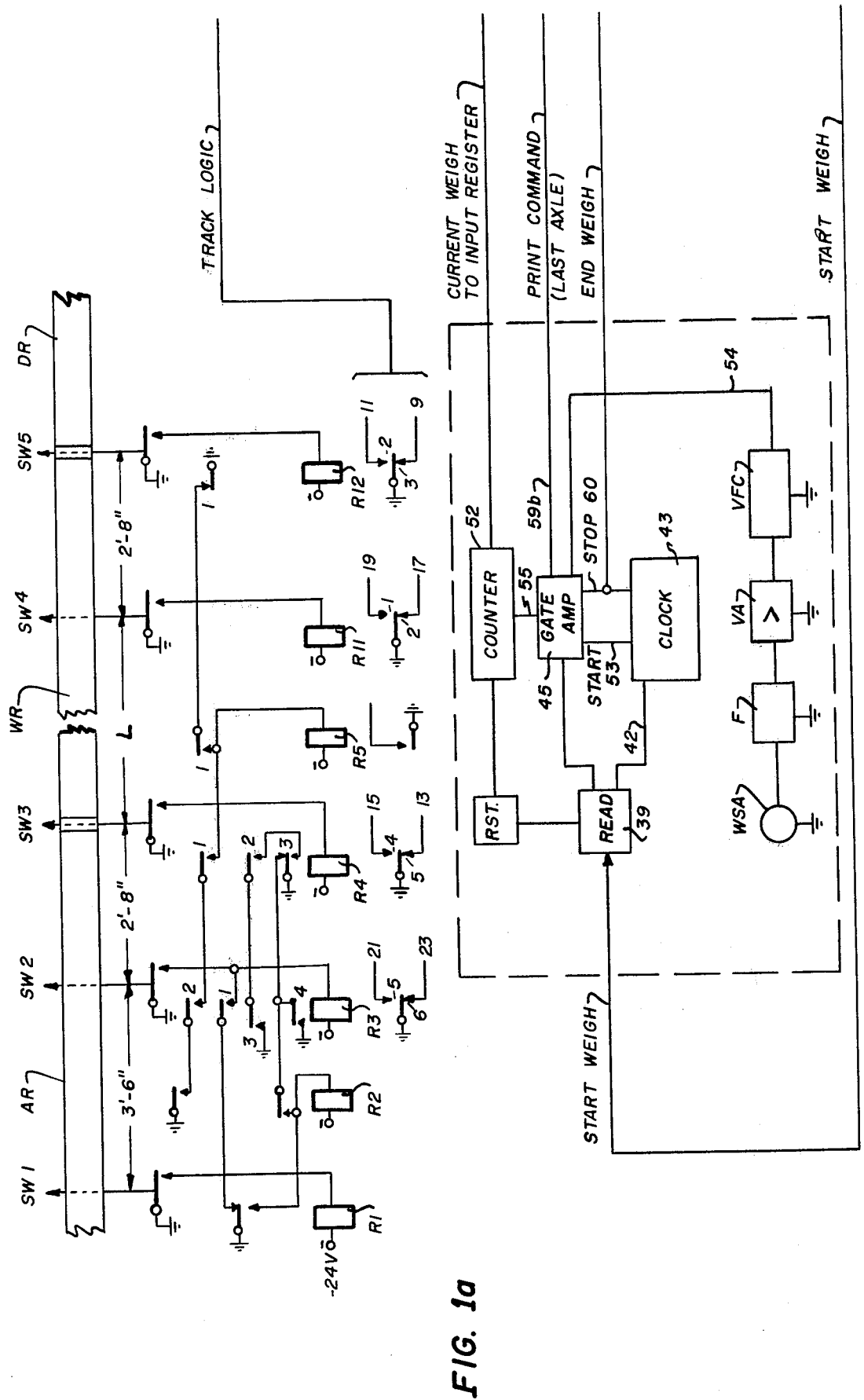

A weigh system exemplary of one such weigh system which can be used with the apparatus of the present invention is disclosed in detail in U.S. Pat. No. 3,374,844, and is generally illustrated in FIG. 1a in conjunction with track switches SW1–SW5 and associated relays R1–R7. In this particular case, the track switches and their associated relays do not control the weigh system WS, but are utilized in a manner described more fully below.

Generally, the weigh system of the above-mentioned U.S. Pat. No. 3,374,844, includes weigh sensing apparatus WSA which may comprise a number of strain gauges or other types of load responsive transducers, which are actuated by the weight on the weight rails WR. One standard method of connecting the strain gauges is a balanced Wheatstone bridge circuit that is unbalanced by the weight on the weigh rails WR producing a voltage between opposite terminals of the bridge circuit which is proportional to that weight at any instant. The voltage from the bridge circuit is filtered through a low pass filter F which filters out the high frequency oscillations and reduces the amplitude of the low frequency oscillations which arise from vibrations caused by the axle of the car rolling onto the weigh bridge WR, thus eliminating most of the errors due to mechanical vibrations. The high frequency vibrations are those above approximately ten cycles per second. The filtered voltage is fed to an amplifier VA, which supplies a proportionate amplified voltage to a voltage to frequency converter VFC. The filtering of the output voltage of the bridge circuit that is above referred to may be done before or after amplification of the voltage. The frequency converter VFC produces a train of positive pulses of a frequency proportionate to the received weigh signal voltage, and therefore proportional to the weigh on the weigh bridge WR. The variable frequency weight pulse train is delivered over weight conductor 54, to a gate amplifier 45. The converter VFC may provide a pulse train over conductor 54 of 100,000 pulses per second for each 100,000 pounds on the weigh rails WR, which is one pulse per second for each one pound of weight.

After an axle to be weighed is on the weigh rail, the actual weighing is delayed for a fixed time which, in a preferred embodiment of the present invention, is of the order of 0.2 seconds. It is then weighed by measuring the filtered voltage. This is done by integrating the output of the frequency converter VFC for a fixed period of time which, in the preferred embodiment of the invention, is of the order of 0.2 seconds.

The gate amplifier 45 is maintained normally insensitive to pulses over conductor 54 until the digital clock 43 has counted crystal controlled clock pulses for a substantial fraction of a second (0.2 seconds in the preferred example) following a signal (START WEIGH) that a freight car axle to be weighed is fully supported on weigh rails WR, thus delaying counting responsive to the weight indicating pulse train for 0.2 seconds during which time the filter F has had time to respond fully, and the heaviest vibration induced fluctuations in the weight signal have subsided. The digital clock 43 then places a start signal on conductor 53, which is coincident with a gate signal over conductor 42 to the gate amplifier 45 from the read circuit 39. Thereupon, gate amplifier 45 is rendered sensitive to pass weight proportional frequency pulses from conductor 54 to conductor 55, the input to the decade counter 52. Such pulses pass to counter 52 for a preset short weighing interval (0.2 seconds in the preferred example), at the end of which time the digital clock 43, having been reset to 0 coincident with the start signal on conductor 53, reaches its preset count to send a signal over conductor 60, which signal again renders gate amplifier 45 insensitive to pulses on conductor 54, terminating the pulse train to the decade counter 52, leaving that counter set to a reading indicative of the weight of the freight car axle currently rolling over weigh rails WR. This same signal is used as the END WEIGH signal in the present invention. The weight indicated on counter 52 is coupled into the input register 401.

DETAILED DESCRIPTION

Figure 13:
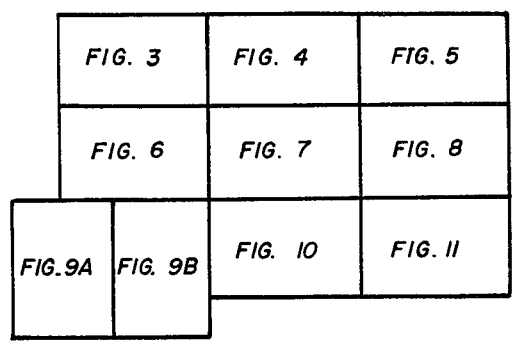
FIG. 13 is an illustration showing the relationships of FIGS. 3-11.

Referring now to the FIGS. 1 and 3–11, with FIGS. 3–11 assembled as shown in FIG. 13, a weighing operation may be described as follows. All of the switches SW1–SW5 are opened.

The train of freight cars to be weighed approaches the weigh station (from the left) and if, for example, the locomotive moving it is behind the train, nothing happens at the weigh station until the leading wheel of the leading truck of the first car of the train reaches and actuates switches SW1, SW2 and SW3 in succession, momentarily closing them. When track switches SW2 and SW3 close, a routine mode of operation is established, as described below.

ROUTINE SELECTION

The operation of the track switches SW2 and SW3 is coupled to the routine selection circuit 300, and indicates to the latter that an axle has entered the weigh bridge. As indicated above, the routine established, that is, the mode of operation in determining an axle weight is established by the routine selection circuit 300, in conjunction with the routine modifier and enable computation circuit 402, the stored routine selection and start computation circuit 404 and the select axle sum or full draft circuit 600, in accordance with these track switch signals. The established routine is stored in flip-flop gates 421, 422, and 423 in the routine modifier and enable computation circuit 402 and, upon receipt of the END WEIGH signal, is coupled to the sub-routine selection circuit 600. The output of the flip-flop gates 421, 422 and 423 is a BCD signal which is coupled to a decoder 505, with each decimal input indicating an established routine. The decoder 505 decodes the BCD input to it, to establish sub-routines R1 through R6. This is illustrated in Table I below.

TABLE I

| DEC. INPUT | Sub-Routine Selection | | | | | |
|---|---|---|---|---|---|---|
| | R1 | R2/4 | R3 | R5 | R6 | |
| 1 | 1 | 0 | 0 | 0 | 0 | Axle enters |
| 2 | 1 | 1 | 0 | 0 | 0 | Axle enters & leaves |
| 3 | 0 | 0 | 1 | 0 | 0 | Axle leaves |
| 4 | 1 | 0 | 1 | 1 | 0 | Full draft |
| 5 | 1 | 0 | 1 | 0 | 1 | Axle sum |
| 6 | 1 | 1 | 1 | 1 | 0 | Axle leaves F. D. |
| 7 | 1 | 1 | 1 | 0 | 1 | Axle leaves A. S. |

For example, for routine 1 or decimal input 1, sub-routine R1 is established. For routine 4 or decimal input 4, sub-routines R1, R3 and R5 are established. These sub-routines may be generally described as follows:

Sub-Routine R1
Axle enters weigh bridge;
Weigh cycle;
Previous bridge weight stored in MOS processor;
Current bridge weight transferred to current weight register;
Previous bridge weight subtracted from current bridge weight;
Axle weight transferred to axle library 1001
Current bridge weight reinserted in MOS processor;
End of sub-routine.

Sub-Routine R2/4
The sub-routine R2 is established when an axle enters the weigh bridge, with an axle about to leave; and the sub-routine R4 is established when an axle leaves weight bridge, with an axle about to enter. The sub-routines R2 and R4 are the same but are initiated from track SW5 in the case of sub-routine R2 and track switch SW3 in the case of sub-routine R4.

In sub-routine R2:
Weigh cycle;
Previous bridge weight stored in MOS processor;
Delay transfer of current weight until axle leaves;
Locate axle weight which left weigh bridge and transfer to MOS processor;
Subtract axle weight which left from previous bridge weight;
New previous bridge weight in MOS processor;
End of sub-routine.

In sub-routine R4:
Weigh cycle
Previous bridge weight stored in MOS processor;
Delay transfer of current weight until axle enters;
Locate axle weight which left bridge and transfer to MOS processor;
Subtract axle weight which left from previous bridge weight;
New previous bridge weight in MOS processor;
End of sub-routine.

Sub-Routine R3
Axle leaves weight bridge;
Weigh cycle;
Current bridge weight transferred to current weight register;
Current weight register transferred to MOS processor;
End of sub-routine.

Sub-routine R5
(Logic in computing unit indicates full draft and LAST AXLE signal present.)
Locate the first "foreign axle" on the weigh bridge; (A foreign axle is one on the weigh bridge but not one of the axles of the car being weighed).
Subtract the foreign axle weight located in axle library 1001 from the current bridge weight in the MOS processor;
Repeat this operation until all foreign axle weights subtracted;
End of foreign axle signal;
Output from MOS processor to output register 1001;
End of sub-routine.

Sub-Routine R6
(Logic in computing unit indicates axle sum and LAST AXLE signal present)
Clear to zero MOS processor;
Locate the first axle of car being weighed in axle library 1001 and transfer to the MOS processor;
Repeat this operation until all axles of the car are added in the MOS processor;
End of axle signal;
Output from MOS processor to output register 1000;
End of sub-routine.

The routines during which the above-described sub-routines are established are selected on the following rules:
Routine 1 (Decimal 1 Input)
Switch 2 only has operated, switch 3 operation.
Routine 2 (Decimal 2 Input)
Switch 2 has operated then switch 4 when switch 3 operates, wait for switch 5 operation.
Switch 4 has operated then switch 2 when switch 5 operates, wait for switch 3 operation.
Routine 3 (Decimal 3 Input)
Switch 4 only has operated, switch 5 operation.
Routines 4, 5, 6 and 7—(Decimal 4, 5, 6 and 7)
Combinations of Routines 1, 2 and 3 are selected dependent on the state of full draft, axle sum and last axle logic.
Other Rules Are:
Switch 3 cannot operate if switch 2 has not.
Switch 5 cannot operate if switch 4 has not.
All switches operated-routine 2.

Switch 2 and switch 3, or switch 4 and switch 5, never operate simultaneously.

Figure 3:
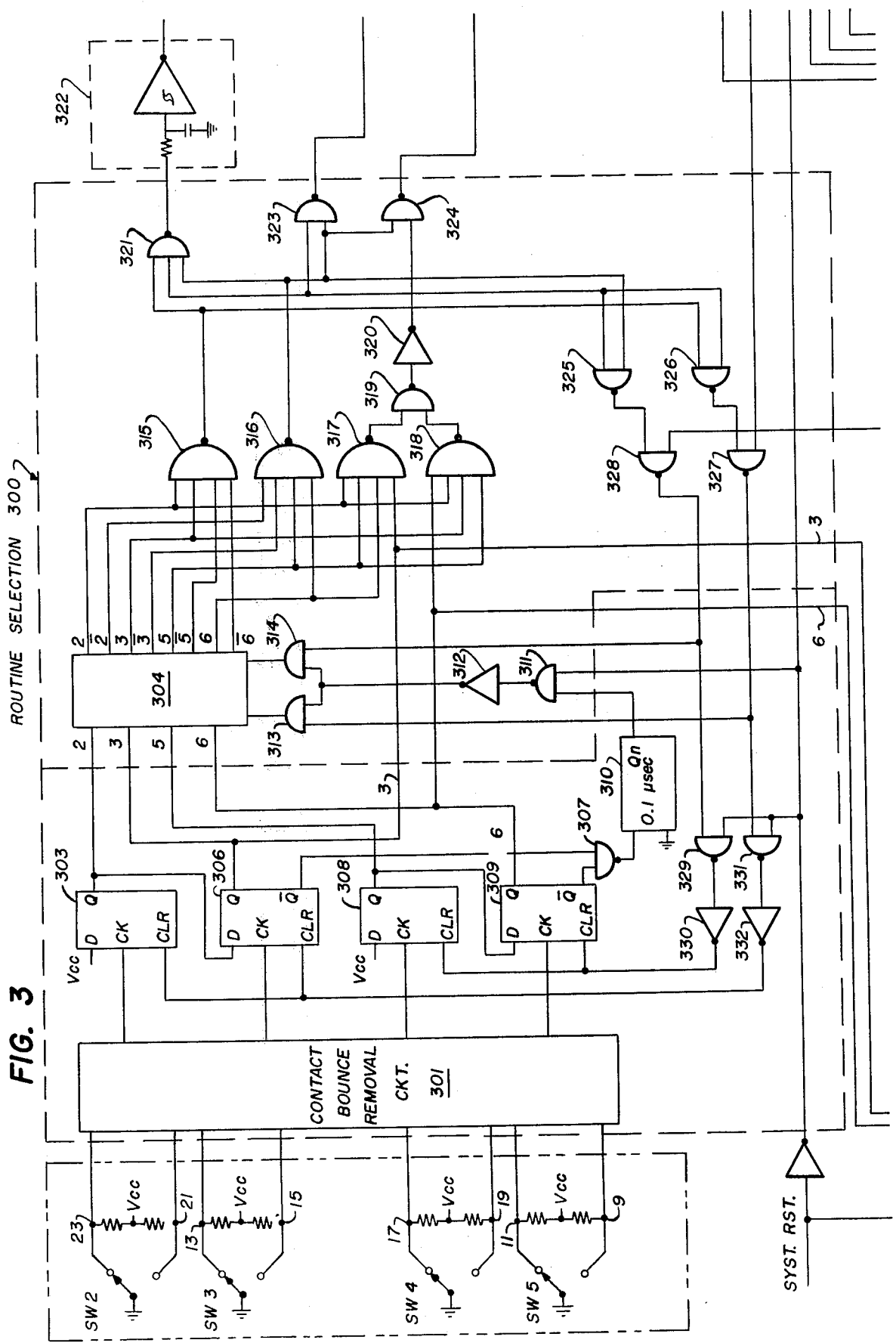
FIG. 3 is a block diagram schematic of the routine selection circuit.
Figure 4:
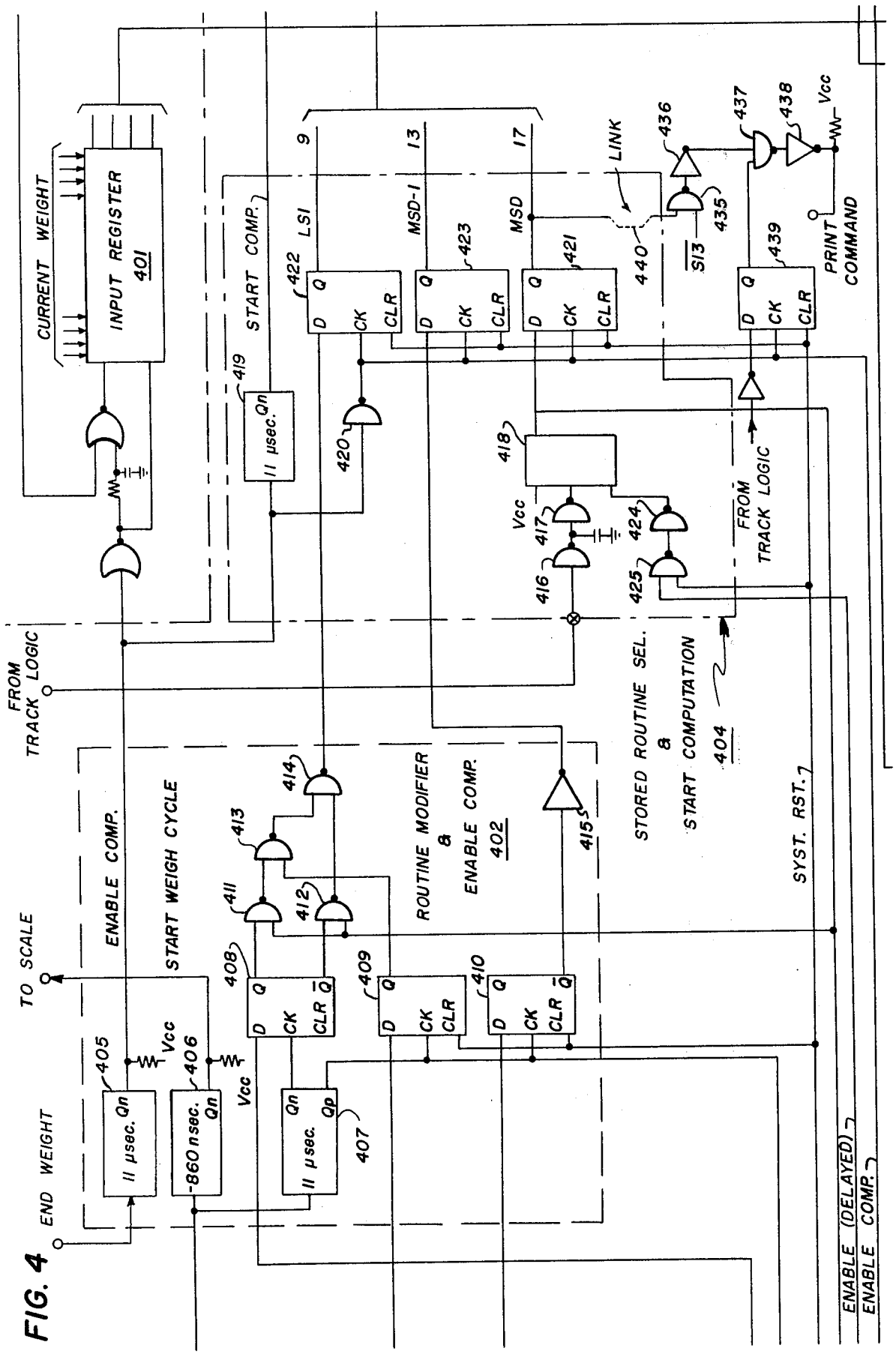
FIG. 4 is a block diagram schematic of the routine modifier and enable computation circuit and the stored routine selection and start computation circuit.
Figure 5:
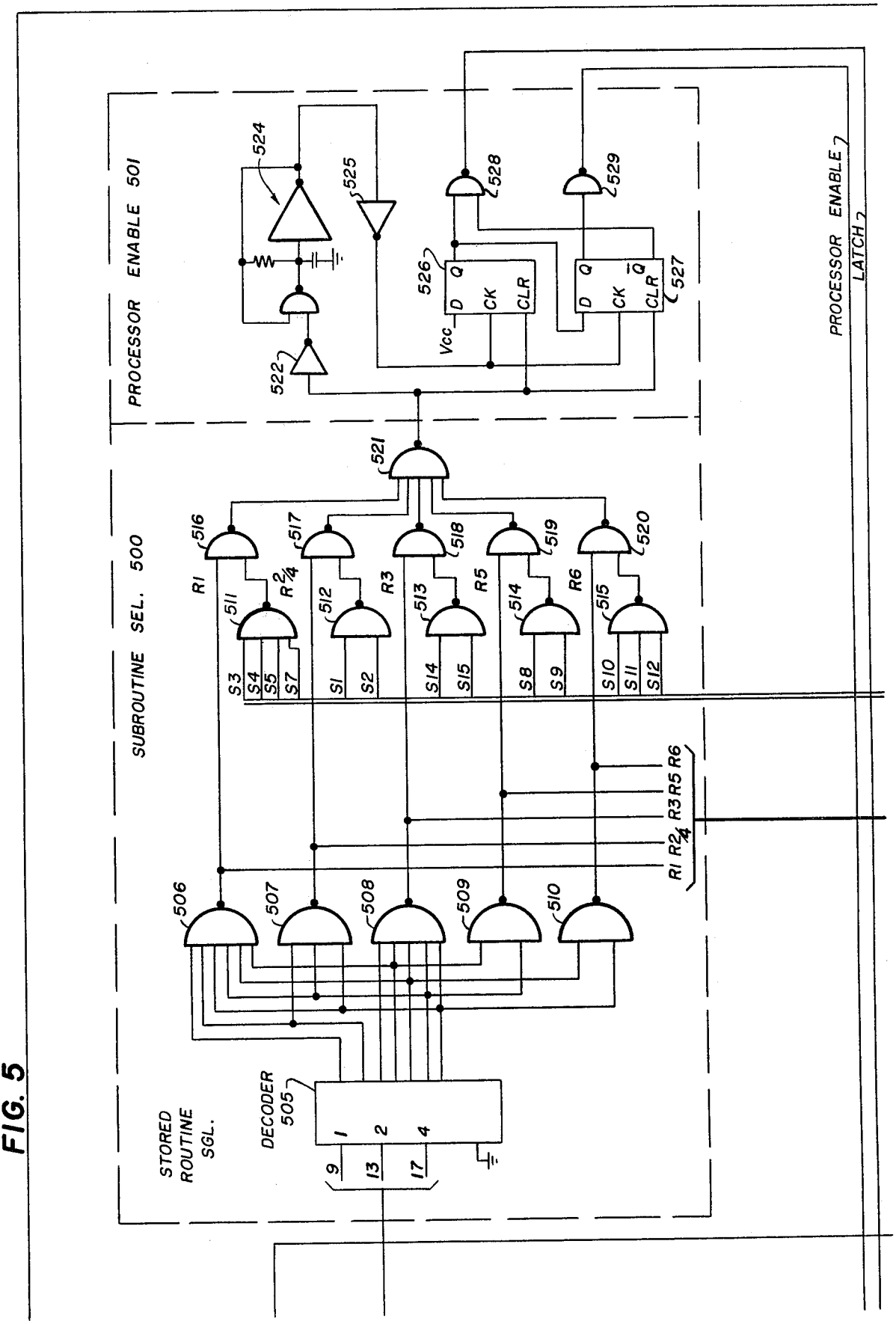
FIG. 5 is a block diagram schematic of the subroutine selector circuit and the processor enable circuit.
Figure 6:
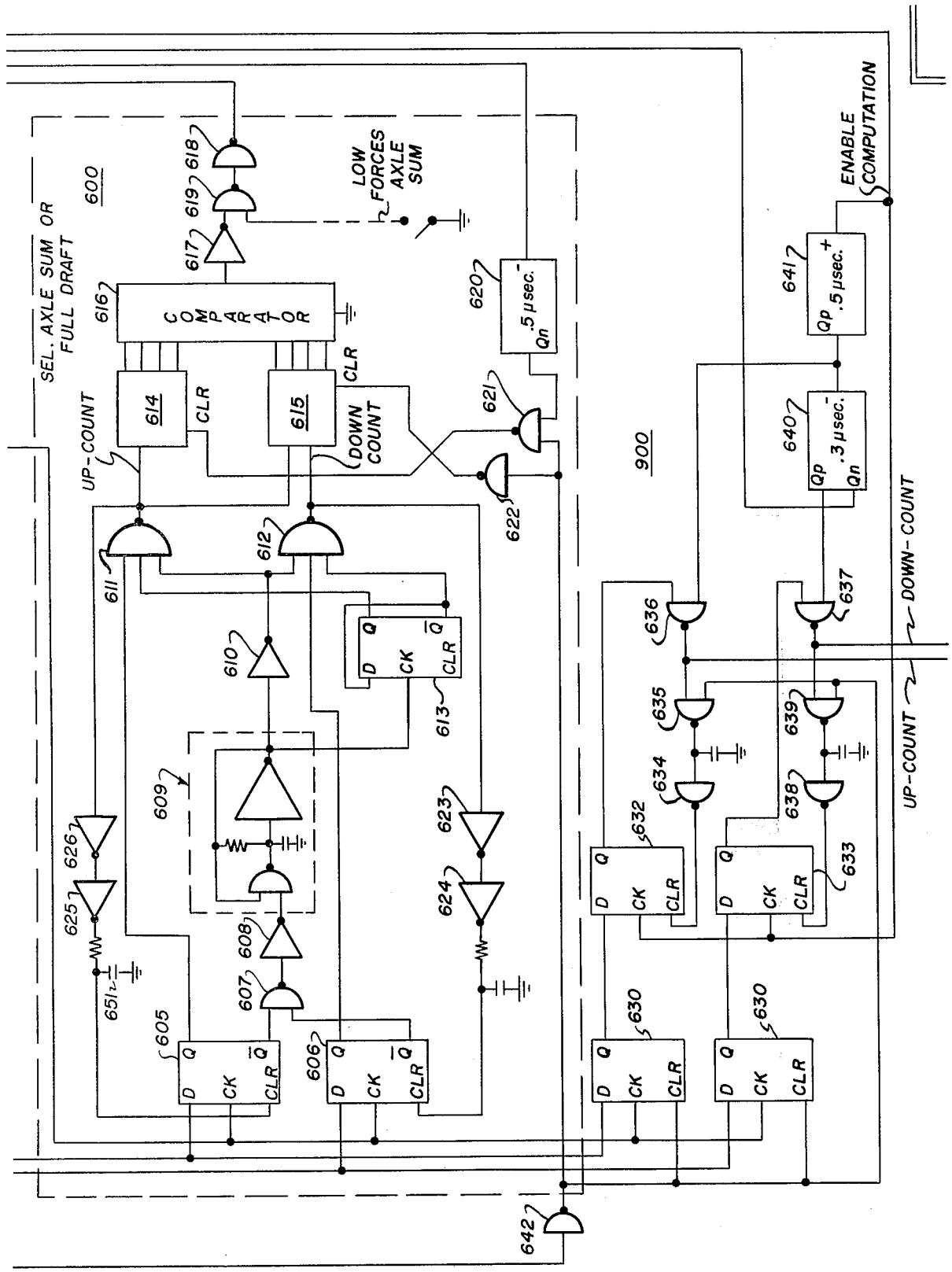
FIG. 6 is a block diagram schematic of the select axle sum or full draft circuit and a portion of the axle library controller.
Figure 7:
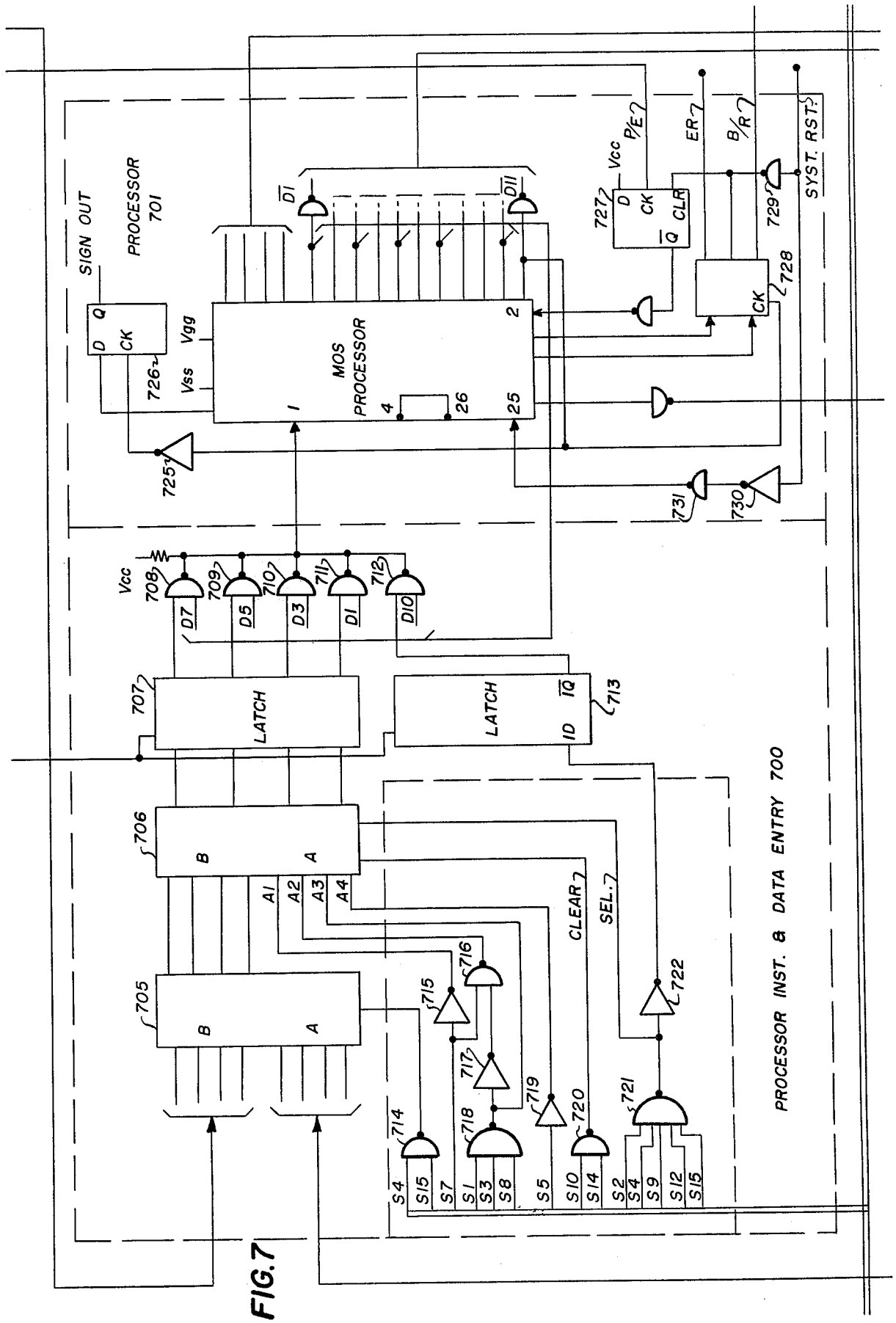
FIG. 7 is a block diagram schematic of the processor instruction and data entry circuit and the processor.
Figure 9A:
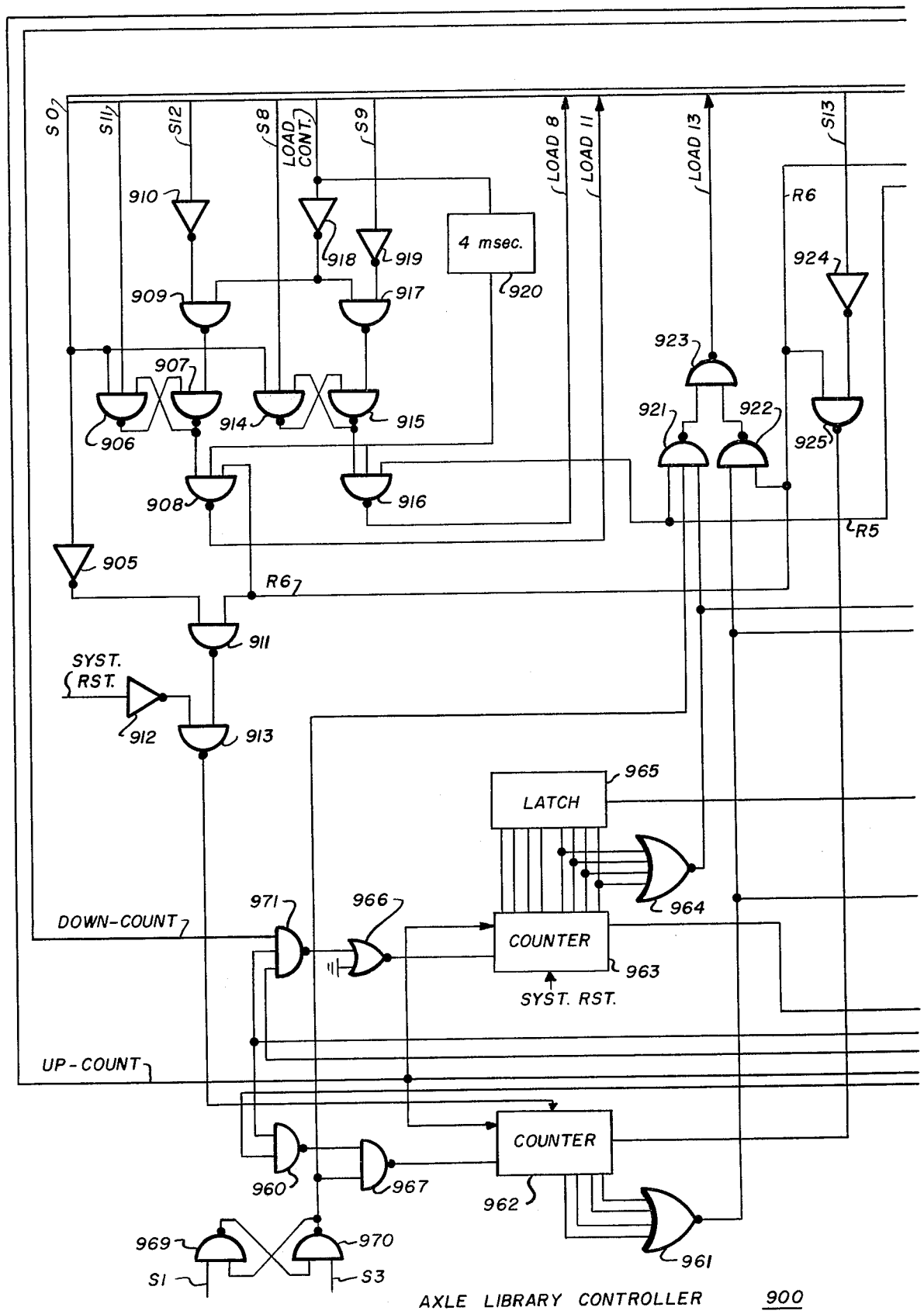
Figure 10:
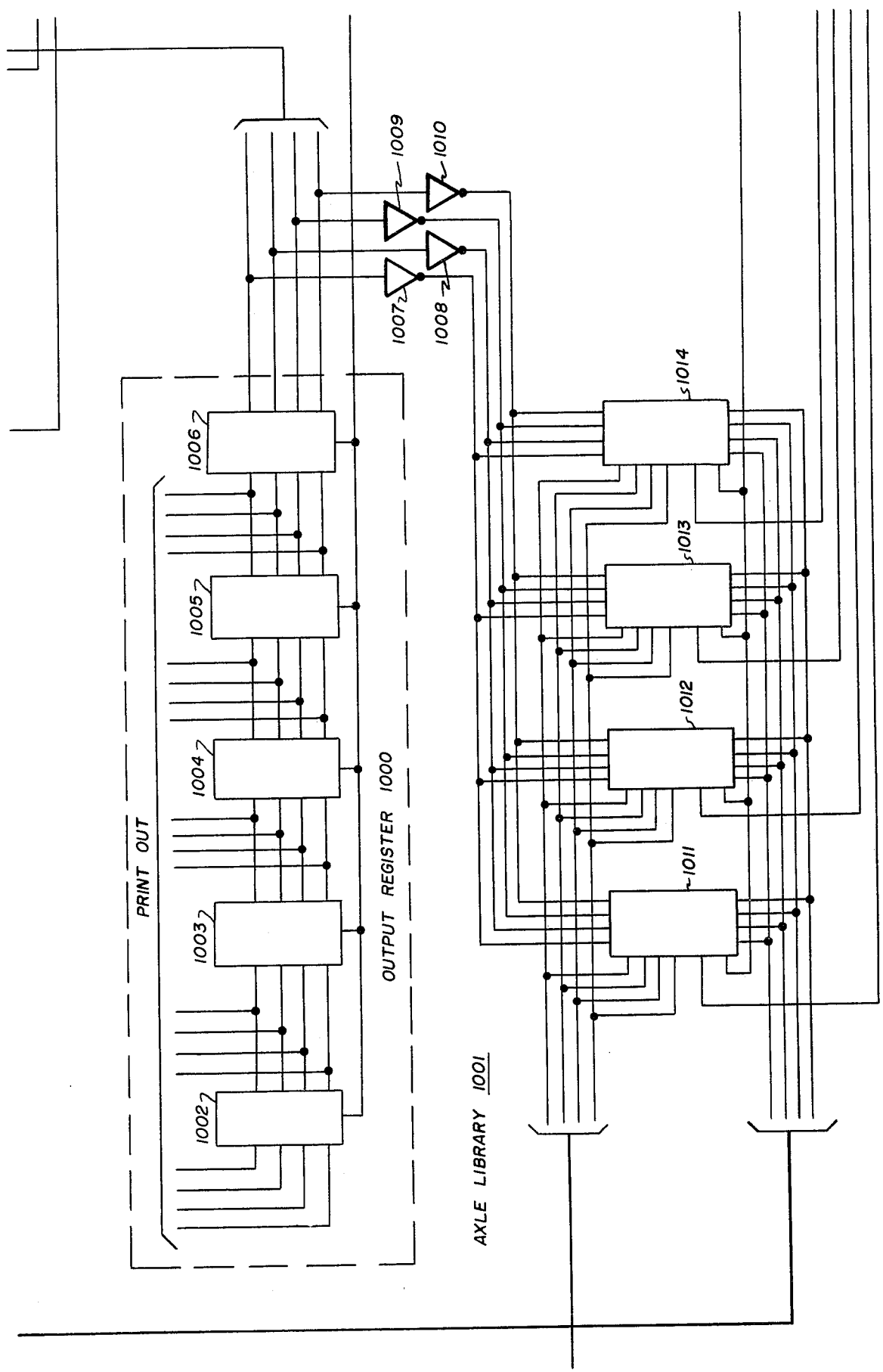
FIG. 10 is a block diagram schematic of the output register and the axle library.
Figure 11:
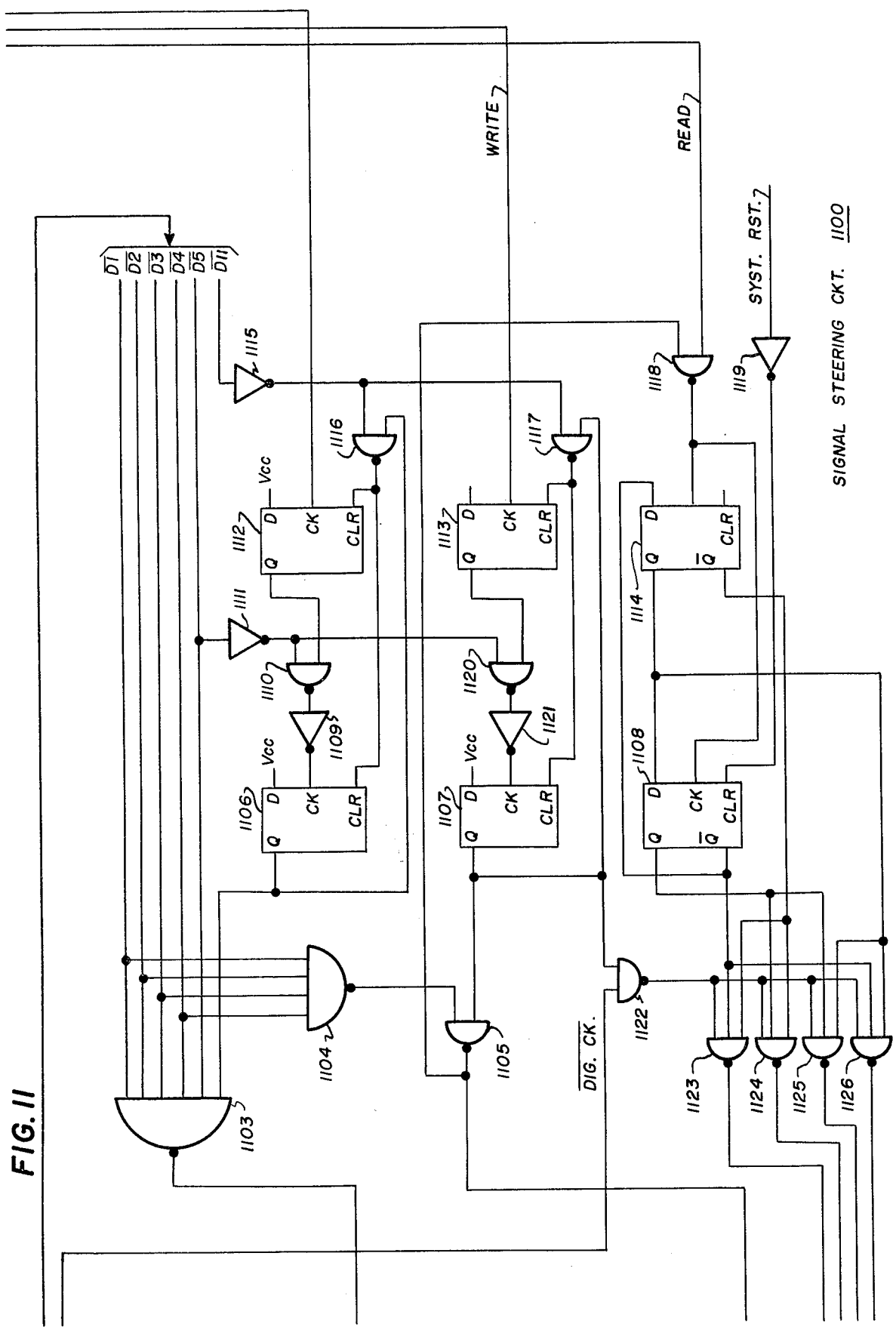
FIG. 11 is a block diagram schematic of the signal steering circuit.

Referring now to FIGS. 3–6, the manner in which the various routines or decimal inputs and sub-routines are established can be explained. In FIG. 3, when the switch SW2 closed, its contact 1 closed ground to the contact bounce removal circuit 301. This circuit removes contact bounce from the relay contacts and further couples a logic 1 to the clock input of the flip-flop 303 to clock it to couple the high (Vcc) or logic 1 at its input to its Q output, to the input 2 of the latch 304 and to the input of the flip-flop 306. Correspondingly, when switch SW3 closed, at its contact 1, ground is extended to the contact bounce removal circuit 301 which, in response, provides a logic 1 to the clock input of the flip-flop 306 to clock it to couple the logic 1 at its input to its Q output to the input 3 of the latch 304. The $\overline{Q}$ output of the flip-flop 306 goes to a logic 0 and is coupled to a gate 307. At this time, the $\overline{Q}$ output of the flip-flop 309 is at a logic 1 and is coupled to the gate 307. The flip-flops 303 and 306, as well as the flip-flops 308 and 309 described below may be SN7474N type flip-flops. The latch 304 may be a type SN7475N. The contact bounce removal circuit 301 may be a type SN74279N.

The logic 0 on the $\overline{Q}$ output of the gate 306 drives the output of the gate 307 high, to a logic 1, and this output is coupled to and triggers a type SN73123N monostable 310 which outputs a negative-going 0.1 microsecond pulse to the gate 311. The output of the gate 311 goes to a logic 1 at this time, and this output is inverted to a logic 0 by the inverter 312 and coupled to one input of the gates 313 and 314. The outputs of these gates 313 and 314 both are driven high, to a logic 1, and these outputs are coupled to the clock inputs of the latch 304 to gate the signals on the inputs 2 and 3 to the 2 and 3 outputs, and the signals on the inputs 5 and 6 to the $\overline{5}$ and $\overline{6}$ outputs, respectively. With the inputs 2 and 3 high and the inputs 5 and 6 low, the 2, 3, 5 and 6 outputs of the latch 304 all are high and the gate 315 is enabled so that its output goes low to a logic 0. None of the gates 316–318 are enabled at this time, hence their outputs remain high, at a logic 1. The low or logic 0 output of the gate 315 is coupled to the gate 321 and drives its output high, to a logic 1. This high or logic 1 output of the gate 321 is coupled after a 1 microsecond delay through a type SN74132N inverter 322 to output a logic 0 pulse to the monostable 406 and 407, each of which may comprise one-half of a type SN74123N dual monostable, of the routine modifier and enable computation circuit 402.

The low or logic 0 output of the gate 315 also is coupled to the gate 326, to drive its output high. This high is coupled to the input of the gate 327. At this time, both inputs to the gates 327 are high and its output goes low. This low is coupled to the gate 331 to drive its output high, to a logic 1. This high is inverted to a logic 0 by the inverter 332, and is coupled to the clear inputs of the flip-flops 303 and 306 to clear them, thus resetting the initial system conditions.

As indicated above, the output of the gate 321 is delayed for 1 microsecond. This delay is to insure that track switch SW4 has not operated. If this switch had operated, the routine selection would be modified, as explained more fully below.

The negative pulse input to the monostable 406 triggers it to produce a negative going 360 nanosecond pulse on its output lead, and this pulse comprises the START WEIGH pulse which is coupled to weigh system WS (FIG. 1). The negative output from the inverter 322 coupled to the monostable 407 triggers it to produce a negative going 11 microsecond pulse on its output lead $Q_n$ and a positive going 11 microsecond pulse on its output lead $Q_p$.

The positive pulse output of the monostable 407 is coupled to the clock inputs of the flip-flops 409 and 410 which may be types SN7474N, to clock the flip-flop 409 to couple the logic 1 on its input to its Q output, to the gate 413. The flip-flop 410 also is clocked to couple the logic 0 on its input to a logic 1 on its $\overline{Q}$ output, to the inverter 415 which inverts the signal to provide a logic 0 to the input of the flip-flop 423.

The same positive pulse from the multivibrator 407 is coupled to the clock inputs of the flip-flops 605 and 606 of the select axle sum or full draft circuit 600, which flip-flops also may be types Sn7474N. The flip-flop 605 is clocked by this pulse to couple the logic 1 on its input (the input 3 of the latch 304) onto its Q output to one input of the gate 611. The flip-flop 606 also is clocked by this positive going pulse to gate the logic 0 on its input (the input 6 of the latch 304) to its Q output to one input of the gate 612. The $\overline{Q}$ outputs of the flip-flops 605 and 606 go to a logic 0 and logic 1 respectively, and these $\overline{Q}$ outputs are coupled to the gate 607 to drive its output high. This high is coupled to the inverter 608 which inverts this signal and provides a logic 0 to the gate input of the oscillator 609 to release it and produce negative going output pulses to the inverter 610 and to the flip-flop 613 which may be a type SN7474N. The inverter 610 inverts this pulse and couples a positive going pulse to the respective inputs of the gates 611 and 612. The Q output of the flip-flop 613 goes to a logic 1 on the first or second output pulse from the oscillator 609, and this Q output is also coupled to the input of the gate 611. The output of the gate 611 therefore goes low, and provides an "up count" output to the counters 614 and 615 to advance their counts by 1. These counters 614 and 615 may be types SN74193N. This same pulse is coupled to the flip-flop 605 to clear it, with the leading edge of the pulse being delayed by the inverters 625 and 626 and the capacitor 651. The output of the gate 612 remains high, since the Q output of the flip-flop 606 is a logic 0 thus inhibiting the gates 612 "down count" input to the counter 615. The counter 614 comprises an "axle per car" counter while the counter 615 comprises an "axle per bridge" counter. Each up count drives the counters 614 and 615 and each down count drives the counter 615, the states of the counters 614 and 615 are coupled into the comparator 616 which may be a type SN7485N. If the count in the counter 615 is greater than the count in the counter 614, the output of the gate 618 is a logic 1. If the converse is true, the output of the gate 618 is a logic 0. The logic 1 on the output of the gate 618 initiates a full draft operation, while the logic 0 on this output lead initiates an axle sum operation, as more fully described below.

The negative pulse on the $Q_n$ output lead of the gate 407 clocks the flip-flop 408 on the positive going edge of the pulse, to couple the axle sum/full draft signal at the output of the gate 618 on to the Q output of the flip-flop 408. The delay provided by clocking the flip-flop 408 on the positive going edge of the negative pulse allows the axle sum/full draft signal to settle, before coupling it to the input of the flip-flop 408. Again, if full draft operation is to be initiated, a logic 1 will appear on the Q output of the flip-flop 408, while a logic 0 will appear at the Q output of this flip-flop if an axle sum operation is to be initiated. At this time, since only one axle has entered the weigh bridge, the LAST AXLE signal from the detection circuit 11 in FIG. 1 is not present. If the LAST AXLE signal is present at logic 1, the output of gate 414 is a logic 1 for axle sum and a logic 0 for full draft, and is coupled to the input of the flip-flop 422.

At this time, the routine to be followed has been selected, by the inputs coupled to the respective flip-flops 421, 422 and 423, each of which may be a type SN7474N. More particularly, since no LAST AXLE signal appeared at the input of the gate 416, the Q output of the flip-flop 418 is a logic 0 and it is coupled to the input of the flip-flop 421 and to the inputs of gates 411 and 412. The output of gate 413 is at a logic 0. The signal at the output of the gate 414 is a logic 1 and is coupled to the input of the flip-flop 422. The $\overline{Q}$ output of the flip-flop 410, at this time, is at a logic 1, with this signal being inverted by the inverter 415 and coupled as a logic 0 to the input of the gate 423. None of these inputs to the flip-flop 421-423 are clocked to the Q outputs thereof, until the END WEIGH signal is received from the weigh system WS (FIG. 1).

Axle Weight Computation

As described above, at the end of the weigh cycle, the weigh system WS couples an END WEIGH signal to the routine modifier and enable computation circuit 402. In particular, this END WEIGH signal is coupled to the monostable 405 which may be a type SN74123N. The monostable 405 provides a negative going 11 microsecond pulse in its $Q_n$ output, and this pulse forms an ENABLE COMPUTATION signal which is coupled to the input register 401, to the input of the monostable 419 which may be a type SN74123N, and through the gate 420 to the clock inputs of the flip-flops 421, 422 and 423. The ENABLE COMPUTATION signal triggers the monostable 419 to provide a negative going 11 microsecond START COMPUTATION pulse on its $Q_n$ output lead to the sequence state controller 800. The flip-flops 421, 422 and 423 are clocked by the ENABLE COMPUTATION signal to provide a binary decimal coded (BCD) output on their respective output Q leads to the decoder 505 of the sub-routine selection circuit 500. The decoder 505 may be a BCD to decimal decoder type SN7442N, with one input thereof permanently grounded. These decimal inputs comprise the stored routine selection signal to establish the various sub-routines R1, R2/4, R3, R5 and R6 described above and as illustrated in Table I.

As described above, the outputs of the flip-flops 421, 422 and 423 provide, at this time, a decimal 1 input indicating a routine 1 to the decoder 505. The decoder 505 decodes this decimal 1 input signal and provides a decoded output to the gates 506-510 which provide sub-routine selection signals R1, R2/4, R3, R5 and R6. In this case, as can be seen in Table I, only the sub-routine R1 is established. The sub-routine selection signals are coupled to the gates 516-520, the sequence state controller 800, and the axle library controller 900.

Sequence State Controller 800

The sequence state controller 800 generates a number of sequence state signals S0-S15 which control entry and exit to the processor 701 and which provide the input register 401, the output register 1000, and memory circuits (axle library 1001) with timing strobes. The sequence state controller 800 includes as its principal components a main counter 814 which may be a type SN74161N synchronous 4-bit counter that counts from 0 through 15 and then again to 0 and stops, a decoder 813 which may a type SN74154N 4-line to 16-line decoder/demultiplexer that decodes the output count of the main counter 814 to provide the sequence state signals S0-S15 and steering circuits 814 and 816 which may be type SN74157N quadruple 2-input data selector multiplexer for exercising control over the main counter 814. The output of the gate 818 is coupled to the load control input of the main counter 814, and if held low, during a clock pulse from the oscillator 810 will reinsert its present state or gate the state of the inputs from the steering circuit 815 or 816 into the main counter, as described more fully below.

The START COMPUTATION signal, upon being coupled to the gate 805 of the latch formed by the two gates 805 and 806 drives the output of the gate 805 high, and this high is coupled to the gate 809. When one input of the gate 808 is at a logic 0, the output of the gate 808 goes high, and is coupled to the gate 809. With both inputs to the gate 809 high, its output goes low and, upon being coupled to the input gate of the oscillator 810 triggers the oscillator to output negative going pulses which are coupled through the inverter 811 to the main counter 814 to advance its count by one on each pulse. The count of the main counter 814 is coupled to the decoder 813 which, as indicated above, decodes the count and provides output signals representing the sequence states S0-S15. The sequence states S0-S15 in conjunction with the sub-routines R1, R2/4, R3, R5 and R6 enable the gates 511-515 to provide a LATCH and a PROCESSOR ENABLE signal to the processor instruction and data entry control circuit 700 to gate an instruction or data into the processor 701 and to enable the processor 701, respectively, in a manner more fully described below. The sequence states S0-S15 and sub-routines R1, R2/4, R3, R5 and R6 also enable the gates 828-832 to provide MEMORY READ and WRITE control signals to the axle library controller 900 and to the signal steering circuit 1100, and LOAD CONTROL signals to the main counter 814 for controlling the flow of data into and out of the axle library 1001 and for loading the count of the main counter 814. The LOAD CONTROL signal can function to drive the load control input of the main counter 814 low, so that the outputs of the steering circuits 815 and 816 can be gated into the main counter 814 to set its count. Generally, the LOAD CONTROL signal is utilized to hold certain sequence states, to permit the serial transfer of data into the MOS processor of the processor 701.

MOS Processor

The processor 701 contains the MOS processor and its associated steering and output buffering circuitry. The MOS processor is a type TMSO117NC arithmetic processor which operates at a frequency of 400 KHz maximum and the oscillator used is set to run at this frequency or below.

The MOS processor receives and outputs information serially and twelve timing signals D1-D11 and DIGIT CLOCK are generated to provide synchronous entry. It is a 10 digit processor, but only 5 digit operation is used. Signals are clocked into the MOS processor on its input designated I. When the $\overline{Q}$ output of the latch 713 is at logic 1 during D10, data operation is indicated, and if at logic 0, instruction operation is indicated.

When the PROCESSOR ENABLE signal goes to a logic 1, the $\overline{Q}$ output of the gate 727 goes to a logic 0 which places a logic 1 on pin 2, provided that the BUSY/READY signal is at a logic 0. As soon as the BUSY/READY signal goes to a logic 1, pin 2 must be returned to logic 0. The connection of the $\overline{BUSY/READY}$ output of the latch 728 to the clear input of the flip-flop 727 achieves this action.

The system reset signal clears gate 727 by forcing the output of the gate 729 to logic 0, and clears the MOS processor on pin 25, The MOS is wired for fixed decimal point operation by connecting pin 4 to pin 26.

In Table II below, the relationship between the sequence states, the sub-routines established and the steering signals are shown. With reference to Tables I and II, the operation of the computing unit during the various established routines and sub-routines can be described.

coupled to its output by a logic 0 or 1 on its select input S, respectively. Again, in this instance, both of the inputs to the gate 714 are high so that its output is low and its A inputs are selected.

Accordingly, at this time, the A1–A4 inputs to the data selector 706 are 0, 1, 1 and 0, respectively, and as can be seen in Table II, these steering signals correspond to the instruction SUBTRACT. Also, these inputs are selected and coupled to the output of the data selector 706, since its select input S is at a logic 0.

In the sub-routine selector 500, upon entering sequence state S3, the output of the gate 511 also is driven high by the sequence state S3 signal which now is low. This high is coupled to the gate 516 which, at this time, since R1 is true, outputs a low or logic 0 to the gate 521 to drive its output high. This high is inverted by the inverter 522 and couples to the input gate of the oscillator 524 to trigger it to produce a series of outgoing negative pulses. These negative pulses are inverted by

TABLE II

| SEQUENCE STATES | SUB-ROUTINES | STEERING | | | | INST. |
|---|---|---|---|---|---|---|
| | | A4 | A3 | A2 | A1 | |
| 0 Program not running or completed | | NO ENABLE | | | | 0 |
| 1 Locate axle left and enter SUBTRACT | | 0 | 1 | 1 | 0 | 1 |
| 2 Memory to processor | R2/4 | 4 times MEMORY | | | | 0 |
| 3 Enter SUBTRACT | | 0 | 1 | 1 | 0 | 1 |
| 4 Current register to processor | | 5 times CURRENT | | | | 0 |
| 5 Enter EQUALS | R1 | 1 | 0 | 0 | 0 | 1 |
| 6 Axle to memory | | NO ENABLE | | | | 0 |
| 7 Enter EXCH. OPERANDS | | 0 | 0 | 1 | 1 | 1 |
| 8 Locate axle Full Draft and enter SUBTRACT | | 0 | 1 | 1 | 0 | 1 |
| 9 Memory to processor | R5 | 4 times MEMORY | | | | 0 |
| 10 Enter CLEAR Axle Sum | | 0 | 0 | 0 | 0 | 1 |
| 11 Locate axle Axle Sum and enter ADD | R6 | 0 | 0 | 1 | 0 | 1 |
| 12 Memory to processor | | 4 times MEMORY | | | | 0 |
| 13 Output to buffer register | | NO ENABLE | | | | 0 |
| 14 Enter CLEAR | | 0 | 0 | 0 | 0 | 1 |
| 15 Current register to processor | R3 | 5 times CURRENT | | | | 0 |

Sub-Routine R1

As can be seen in Table I above, during routine 1 or decimal 1 input, only the sub-routine R1 is established. Also, in Table II, it can be seen that only the sequence states S3–S7 are utilized.

More particularly, when the START COMPUTATION signal is coupled to and triggers the gate 805 to start the oscillator 810, the latter couples pulses to the main counter 814 to advance its count by one on each pulse. The sequence states advance from S0 through S2 with no effect. Upon entering sequence state S3, in the processor instruction and data entry circuit 700, S3 is low and drives the output of gate 718 high. The high is coupled to the A4 input of the data selector 705 which may be a type SN74157N data selector/multiplexer, and through the inverter 717 to the gate 716 to drive its output high. This high is coupled to the A2 input of the data selector 706. Sequence state S5 is high, and the inverter 719 inverts this high to a low and couples it to the A4 input of the data selector 706. The A or B inputs to the data selector 706 are selected and coupled to the outputs, by the input to its select input S. A logic 0 on this select input S selects the A inputs, while a logic 1 selects the B inputs. In this instance, all of the inputs to the gate 721 are high, so that a logic 0 is coupled to the select input S and the A inputs therefore are selected. The A inputs contain the instructions and the B inputs contain the data from the input register 401 or the axle library 1001. The data selector 705 is like the data selector 706, and the data on its A or B input is selected and the inverter 525 and coupled to the clock inputs of the flip-flops 526 and 527, both of which may be type SN7474N. After approximately one microsecond, the Q output of the flip-flop 526 goes to a logic 1, and this output is coupled to the input of the flip-flop 527 and to the gate 528. The $\overline{Q}$ output of the flip-flop 527, at this time, is at a logic 1, and this output also is coupled to the gate 528. At this time, both inputs of the gate 528 are high, and the logic 0 output which is the LATCH signal is coupled to the latch 707 and the latch 713 of the processor instruction and data entry circuit 700, which latches may be types SN7475N. Upon setting the latches 707 and 713, the instruction data on the input leads A of the data selector 706 are latched into and stored in the processor instruction and data entry circuit 700. On the next clock pulse from the oscillator 524, the output of the flip-flop 527 goes high and enables the gate 529 to produce the PROCESSOR ENABLE signal to the clock input of the flip-flop 727 of the processor 701. The LATCH signal, at this time, returns to a logic 0.

Once the PROCESSOR ENABLE signal is coupled to the processor 701, after approximately 2.5 milliseconds, the BUSY/READY signal goes to logic 1 and, after approximately 3 milliseconds, the BUSY/READY signal goes to logic 0 and restarts the oscillator 810. The sequence state advances to sequence state 4. The output of the gate 714 goes to a logic 1, and the data in the input register 401 is gated into the MOS processor. As indicated above, the MOS processor of the processor 701 receives information serially, and the sequence state signal S4 therefore must be repeated five times to gate this data into the MOS processor. The circuitry required to produce five processor enable signals to load this data, that is, the current weight (the weight in the input register 401) into the MOS processor is included in the sequence state controller 800. In particular, the sub-routine signal R1 is coupled to the gate 831 and the sequence state S4 signal is coupled through the inverter 825 to the gate 831. With both inputs to the gate 831 high, its outputs a logic 0 to the input of the gate 834 to drive its output high. This high or logic 1 is coupled to the divide-by-five counter 840 which may be a type SN7490 divide-by-five counter. This logic 1 output signal from the gate 834 also is coupled to the input register 401 to gate it to output the data stored in one of its counters to the data selector 705 of the processor instruction and data entry circuit 700. The operation of the divide-by-five counter 840 and the circuitry associated with its output provides a LOAD CONTROL signal which holds the load control input of the main counter 814 at logic 0 during S4 and R1, so that the output of the steering circuit 815 which now corresponds to S4 is gated into the main counter, on the next clock pulse from the oscillator 810.

This LOAD CONTROL signal also is coupled to the axle library controller 900, to the inverter 918 which inverts and couples a logic 1 signal to the input of the gate 917. The other input of the gate 917 is at a logic 0 at this time, hence a logic 1 is coupled to the gate 915 of the latch comprising the gates 914 and 915. This latch is operated to output a logic 0 to the input of the gate 916. The signal R5 is also low at this time to the gate 916. Load 8 signal is therefore at logic 1 and has no effect on sequence state controller 800.

The above-described operation is repeated and when all of the data from the input register 401 has been coupled into the MOS processor, the divide-by-five circuit removes the logic 0 on the load control input of the main counter 814 and the main counter 814 advances its count by 1 on the next clock pulse from the oscillator 810, to sequence state S5.

As can be seen in Table II above, when the sequence state advances to sequence state S5, the instruction EQUALS is coupled into the MOS processor, in generally the same manner as the instruction SUBTRACT was entered. In particular, in the processor instruction and data entry circuit 700, the sequence state S5 signal which is now low is coupled to the inverter 719 which inverts it and couples a logic 1 to the A4 input of the data selector 706. Since none of the sequence states S1, S3, S7 and S8 are true at this time, the other inputs A1, A2 and A3 of the selector 706 all are at logic 0, so that the A1–A4 inputs are at 0, 0, 0 and 1, respectively. As indicated in Table II, these steering signals correspond to those required to enter the instruction EQUALS into the MOS processor. The output of the gate 721 also is at a logic 1, at this time, to trigger the data selector 706 to select the instruction inputs A, rather than the data inputs B. Simultaneously, the gates 511, 516 and 521 are enabled to again trigger the oscillator 524 to set the flip-flops 526 and 527 to output the LATCH and PROCESSOR ENABLE signals, respectively, in the manner described above. The MOS processor now computes the axle weight of the axle which entered the weigh bridge, and stores this axle weight in its current weight register.

Next, the sequence state is advanced to sequence state S6, by the main counter 814 and the decoder 813, in the manner described above. As can be seen in Table II above, the axle weight stored in the MOS processor is now coupled into the axle library 1001.

The axle library 1001 contains the memory circuits 1011–1014, having a total storage of 16×16 bits of data. Axle weights of four digit binary coded decimal (BCD) and up to 16 axles can be stored. The memory circuits 1011–1014 may be types SN7489N, and each of these memory circuits inverts the stored data and the true data input is inverted by the inverters 1007–1010, so that upon read out, the true data is outputed. On writing into and reading out of the memory circuits of the axle library 1001, each word of four digits enters and leaves one digit at a time.

The MOS processor timing signals $\overline{D1}$-$\overline{D6}$ and $\overline{\text{digit clock}}$ are used to write into the axle library 1001.

More particularly, upon entering sequence state S6, the sequence state S6 goes to logic 0 and the sub-routine R1 is at logic 1. In the sequence state controller 800, the output of the gate 827 is driven low and coupled to the inverter 833 which inverts this low to a logic 1. This logic 1 forms a MEMORY WRITE signal which is coupled to the clock input of the flip-flop 1113 which may be a type SN7474N edge-triggered flip-flop of the signal steering circuit 1100. This signal clocks the flip-flop 1114 to provide a logic 1 output on its Q output of the gate 1120. The next $\overline{D5}$ pulse from the MOS processor is coupled through the inverter 1111 to the other input of the gate 1120, and the latter is enabled to output a logic 1 which is coupled through the inverter 1121 to the clock input of the flip-flop 1107, which also may be a type SN7474N. The flip-flop 1107 is clocked by this pulse to produce a logic 1 output on its Q output to the gate 1005. This logic 1 also is coupled to the gate 1117, to ready this gate to clear the flip-flops 1113 and 1107 on the next $\overline{D11}$ pulse from the MOS processor, and to the gate 1122 to ready this gate for receipt of the digit clock pulses.

On the next $\overline{D4}$ pulse from the MOS processor, the gate 1104 is enabled to provide a logic 1 output to the one input of the gate 1105. The gate 1105 now is enabled to permit a logic 0 on the write enable WE to the memory circuits 1011–1014, which may be type SN7489N memory.

This logic 0 signal also is coupled to the gate 1118, and its output is driven high and coupled to the clock inputs of the flip-flops 1108 and 1114, which may also be type SN7474N. The flip-flop 1114 is clocked to provide a logic 1 output on its Q lead to the input of the flip-flop 1108 and also to the gates 1125 and 1126 to prime the latter. On the $\overline{\text{digit clock}}$ pulse, a negative going pulse, from the MOS processor, to the gate 1122, this gate is forced to provide a positive going output pulse to each of the gates 1124–1126. At this time, only the gate 1126 is enabled to couple a logic 0 signal to the memory enable input of the memory circuit 1011. The data on the MOS processor output at the time of signal $\overline{D4}$ enters the memory circuit 1011. Similarly, during the timing signals $\overline{D3}$, $\overline{D2}$, and $\overline{D1}$, the data is written into the respective memory circuits 1012, 1013, and 1014, respectively, in the fashion described, so that the axle weight is entered in the axle library.

Upon the occurrence of the next timing signal $\overline{D11}$, the latter is coupled through the inverter 1115 to the gate 1117, to enable this gate to clear flip-flops 1107 and 1113. In clearing the gate 1107, the WRITE ENABLE signal also is removed. The timing signal D11 is coupled to the clock input of the latch 728 so that the BUSY/READY signal coupled to the gate 808 again starts the oscillator 810 to advance the main counter 814 to advance the sequence state to sequence state S7. As can be seen in Table II above, upon entering the sequence state S7, the instruction EXCHANGE OPERANDS is coupled into the MOS processor, in the manner described above, when the A1–A4 inputs to the data selector 706 are a 1, 1, 0 and 0, respectively.

As indicated above, and as can be seen in Table II, only sequence states S3–S7 are used during sub-routine R1. Accordingly, after having reached the sequence state S7, the sequence state controller 800 is merely advanced through sequence states until sequence state S13 is reached. Each cycle of counter 814 initiates a transfer of output data to output register 1000, during sequence state S13. On reaching sequence state S13, the output register 1000 is loaded with the data contained in the MOS processor output register. More particularly, the sequence state S13 signal is inverted in inverter 835 and clocks flip-flop 1112. The Q output of flip-flop 1112 moves to logic 1 and enables gate 1110. The next $\overline{D5}$ pulse from the MOS processor is inverted in inverter 1111 and the pulse output passes through enabled gate 1110 and inverter 1109 to the clock input of flip-flop 1106. The Q output of flip-flop 1106 places a logic 1 on the gate 1103 and either drives the output to logic 0 if the $\overline{D5}$ pulse is finished or enables gate 1103 so that the $\overline{D5}$ pulse will drive the output to logic 0 when the pulse is finished. The change from logic 1 to logic 0 on the output of gate 1103 feeds the output register 1000. The data contained in the MOS processor output register at the digit 5 location is clocked into digit register 1006 which may be a type SN74L98N. The following $\overline{D4}$ pulse moves the output of gate 1003 from logic 0 to logic 1 and back to logic 0 clocking the data contained in the MOS processor output register at the digit 4 location into digit register 1000 and moving the data in digit register 1006 to 1005. Pulses $\overline{D3}$, $\overline{D2}$ and $\overline{D1}$ operate in a similar manner until the output register 1000 contains the data contained in the MOS processor output register. This is the end of sub-routine R1.

Sub-Routine R2 and R4

As indicated above, a sub-routine R2 or R4 operation is established if an axle enters or leaves the weigh bridge, with an axle about to leave or enter, respectively. As the axle enters the weigh bridge, a weigh cycle is initiated in the manner described above in connection with sub-routine R1. The previous bridge weight is stored in the MOS processor and, during the sub-routine R2 operation, the current weight recorded in the input register 401 is delayed and not transferred to the MOS processor until the axle which has left the weigh bridge is subtracted from the previous bridge weight. The axle weight of the axle which just left the weigh bridge is located in the axle library 1001 and is transferred to the MOS processor and subtracted from the previous bridge weight. Sub-routine R1 then follows.

More specifically, the track switch locations cause the following sequence of track switch SW operations if an axle is about to leave as one enters the weigh bridge. Operation of track switch SW2 produces a clock to flip-flop 303 via the circuit 301. The Q output of flip-flop 303 goes to a logic 1. If an axle is to leave the weigh bridge during the weigh cycle, track switch SW4 will operate before track switch SW3. Track switch SW4 operation causes flip-flop 308 to receive a clock pulse via the circuit 301. The Q output of flip-flop 308 goes to a logic 1. Track switch SW3 will now operate and produce a clock to flip-flop 306 via the circuit 301. The Q output of flip-flop 306 goes to a logic 1 and the $\overline{Q}$ output to logic 0. This logic 0 is coupled to and drives the output of the gate 307 high to again trigger the monostable 310 which couples a negative going 0.1 microsecond pulse to the gate 311. The output of this gate goes high and is inverted by the inverter 312 and coupled to the inputs of gates 313 and 314 to enable them to trigger the latch 304.

At this time the inputs 2, 3 and 5 are logic 1 and these states are transferred to the output of latch 304. Gate 318 is primed by outputs 2, 3 and 5. When the axle now leaves the weigh bridge, track switch SW6 will operate and produce a clock pulse to flip-flop 309 via the circuit 301. The Q output of flip-flop 309 goes to a logic 1 and the $\overline{Q}$ output of logic 0. The $\overline{Q}$ output of logic 0 has no effect because the other input to gate 307 is already at logic 0. The Q output of flip-flop 309 moving to logic 1 forces the output of gate 318 to logic 0 and gate 319 to logic 1 and gate 320 to logic 0. The logic 0 at the output of gate 320 drives the outputs of gates 321, 323, 324, 325 and 326 to logic 1. The gate 321 output is delayed by 1 microsecond and drives gate 322 to a logic 0 on its output. The change from logic 1 to logic 0 on the output of gate 322 triggers monostables 406 and 407. The positive going pulse $Q_p$ from monostable 407 clocks flip-flops 409 and 410 and clocks the logic 1 at the input to the Q outputs. The positive going pulse $Q_p$ from monostable 407 also feeds gates 328 and 327 to provide a clear pulse to flip-flops 303, 306, 308 and 309 and latch 304 via gates 327, 328, 329, 330, 331, 332, 311, 312, 313 and 314 as described above in sub-routine R1 selection. The positive going pulse $Q_p$ from monostable 407 also feeds flip-flops 605, 606, 630 and 631 in the select axle sum or full draft circuit 600 and clocks the logic 1 on the outputs of flip-flops 306 and 309 designated 3 and 6 respectively, to the Q outputs of flip-flops 605 and 606 respectively and flip-flops 630 and 631 respectively. Monostable 406 when triggered by the logic 1 to logic 0 transition from gate 322 outputs a negative pulse as a START WEIGH cycle to the scale. The $\overline{Q}$ outputs of each of these flip-flops 605 and 606 go low to a logic 0 driving the output of the gate 607 high to a logic 1. The latter signal is inverted by the inverter 608 and coupled to the oscillator 609 to trigger it to output a negative going pulse to the inverter 610 and to the clock input of the flip-flop 613. This negative going pulse is inverted by the inverter 610 and is coupled as a positive going pulse to the inputs of the gates 611 and 612. On the first or second output pulse of the oscillator 609, the logic 1 on the $\overline{Q}$ output of the flip-flop 613 is coupled through its input to the Q output and to the gate 611 to enable it to output a logic 0 to both the counters 614 and 615 to advance by 1 the count of each of these counters. The output from gate 611 feeds inverter 626 the output of which feeds inverter 625 and after a short delay of 0.1 microseconds clears flip-flop 605 and inhibits gate 611.

The next clock pulse from oscillator 609 changes the $\overline{Q}$ output of flip-flop 613 to a logic 1 which enables gate 612 and also passes through gate 612 to counter 615 to reduce by 1 the count of this counter. The output of gate 612 also feeds inverters 624 and hence to 623 and is a delay to clear flip-flop 606 and inhibit gate 612. Both flip-flops 605 and 606 now have $\overline{Q}$ outputs at logic 1 and the output of gate 607 is forced to logic 0. Gate 608 is forced to logic 1 and the oscillator 609 is stopped. Counters 614 and 615 hold the count of the axles per freight car and the axle per weigh bridge respectively and have been updated accordingly.

Assuming now that the count of the counter 615 is smaller than the count of the counter 614 (indicating that the number of axles on the bridge is less than the number of axles on a car), the comparator 616 outputs a logic 1 to the inverter 617 which inverts the same and couples a logic 0 to the gate 619 to drive its output high. The gate 618 functions to invert this high to a low, and this logic 0 is coupled to the input of the flip-flop 480 of the routine modifier and enable computation circuit 402. This logic 0 indicates that the routine is an axle sum routine. The negative going pulse on its positive going edge on the $Q_n$ output lead of the monostable 407 clocks the flip-flop 408 to output a logic 0 signal on its Q output lead to the gate 411 to drive its output high. The Q output of the flip-flop 409 which is low at this time forces the gate 413 to output a logic 1 to the gate 414. The $\overline{Q}$ output of the flip-flop 408 is high and coupled to gate 412. Since no LAST AXLE signal is present, the Q output of flip-flop 418 is at a logic 0. This low is coupled to the gate 412 and drives its output high. Both inputs to the gate 414 now are high, so that it outputs a logic 0 to the input of the flip-flop 422.

At the end of the weigh cycle, an END WEIGH pulse is coupled to the monostable 405 in the manner described above to trigger it to output a negative going 11 microsecond pulse on its $Q_n$ output. This negative going pulse is coupled to the input register 401, to the monostable 419 and to the clock inputs of the flip-flops 421, 422, 423 and 439 via the gate 420. The output of gate 420 is termed the ENABLE COMPUTATION signal. The flip-flops 421 and 422 are clocked by this pulse to couple the logic 0 signals on their input leads to their Q output leads to the input of the decoder 505 of the sub-routine selector circuit 500, and the flip-flop 423 is clocked to couple the logic 1 on its input lead to its Q output to the decoder 505. These inputs 0, 1 and 0 on the inputs 1, 2 and 4, respectively, form a 3-bit decimal code input to the decoder 505 corresponding to a decimal 2 input. On a decimal 2 input, the decoder 505 establishes the sub-routines R1 and R2/4, as indicated in Table I above.

The ENABLE COMPUTATION signal also feeds the additional circuit in the select axle sum or full draft circuit 600 to generate the signals required by the axle library controller 900. As described above the flip-flops 630 and 631 have a logic 1 stored on the Q outputs by the clock pulse from monostable 407. The logic 1 on the Q outputs of flip-flop 630 and 631 are clocked into flip-flops 632 and 633 respectively to give a logic 1 at the Q outputs of flip-flops 632 and 633. The ENABLE COMPUTATION signal produces a positive pulse from the output of monostable 641 and this feeds gate 636 which is now enabled by the Q output of flip-flop 632. The output of gate 636 feeds an UP count to the axle library 900 and advances by 1 counters 963, 962 and 959. This pulse after a delay of 0.1 microseconds clears flip-flop 632 via gates 635 and 634. The negative going edge of the pulse from monostable 641 triggers monostable 640 and the positive pulse feeds gate 637 which is enabled on its other input by the Q output of flip-flop 633. The negative pulse on the output of gate 637 feeds a DOWN count to the axle library 900 and reduces by 1 the count in counter 963. This pulse after a delay of 0.1 microseconds clears flip-flop 633 via gates 639 and 638.

The monostable 419 also is triggered by the monostable 405 output pulse on its positive going edge to produce a negative going 11 microsecond START COMPUTATION pulse on its $Q_n$ output to the gate 805 of the sequence state controller 800 to trigger the oscillator 810 to advance the count of the main counter 814, to establish sequence state S1 in the manner described above.

As can be seen in Table II above, sequence states S1 and S2 are used during sub-routine R2/4 and during the sequence state S1, the axle weight of the axle which left the weigh bridge is located in the axle library 1001 and the instruction SUBTRACT is entered in the MOS processor. During sequence state S2, this axle weigh is transferred to the MOS processor.

More particularly, the inputs S4 and S15 to the gate 714 of the processor instruction and data entry circuit 700 both are at a logic 1, hence a logic 0 is coupled to the selector 705 to select the inputs on its A input, i.e., the memory data from the axle library. With respect to the selector 706, the A inputs thereof, the signal S7 is at a logic 1 and is inverted by the inverter 715 to present a logic 0 to the A1 input. The signal S1 is at a logic 0, hence the output of the gate 718 is driven high. This high is inverted by the inverter 717 and coupled to the gate 716 to drive its output high so that the A2 input is at a logic 1. The output of the gate 718 which is a high is coupled to the A3 input. The signal S5 is also at a logic 1, inverted by the inverter 719 and coupled to the A4 input as a logic 0. Accordingly, the steering signals 0110 are presented on the A inputs to the latch 706, and as indicated in Table II above, correspond to the instruction to enter SUBTRACT into the MOS processor. All of the inputs to the gate 721 are at a logic 1, hence its output is a logic 0. This logic 0 is coupled to the latch 706 to select the A inputs to the latch 706. This logic 0 also is coupled through the inverter 722 to present a logic 1 to the latch 713 to select the instruction data.

With reference to the axle library controller 900, the signal S1 being at a logic 0, is coupled through the inverter 934 to provide a logic 1 input to the gate 935. Since the signal R2/4 is true, or at a logic 1, the gate 935 is enabled to output a logic 0 to the input of the gate 951 to drive its output high. This high output of the gate 951 is coupled to the input of the gate 950. The signal S8 is at a logic 1 and is inverted by the inverter 932 and coupled as a logic 0 to the input of the gate 933 to hold its output high. This high output is coupled to the input of the gate 951, the input of the gate 952 and the input of the monostable 948. The outputs of both of the gates 952 and 953 are driven high by the outputs of the gates 964 and 961, respectively, both of which are low at this time, as more fully described below, so that the gate 950 is enabled to provide a logic 0 output to the inputs of the gate 949 and to the input gate of the oscillator 947. This logic 0 at the input of the gate 949 drives its output high to trigger the monostable 954 to produce a positive going 0.125 microsecond pulse on its output lead $Q_p$ to the latches 960 and 965 to transfer thereto and to retain therein the counts registered within the counters 959 and 963, respectively. These latches 960 and 965 may be types SN7475N, and the counters 959 and 963 types SN74193N.

The logic 0 output of the gate 950 to the input gate of the oscillator 947 triggers the latter to produce negative going output pulses which are coupled through the inverters 946 and 945 so as to present negative going pulses to the gates 957 and 971. These negative going pulses function as count down pulses to the counters 959 and 963. When the counter 963 counts down to 0, the output of the NOR gate 964 goes to a logic 1, and this signal is coupled to the gates 921 and 952. Both of the inputs of the gate 952 now are at a logic 1 so that it is enabled to provide a logic 0 output to the input of the gate 950 to drive its output high to a logic 1. This logic 1 at the output of the gate 950 upon being coupled to the input gate of the oscillator 947 causes the oscillator 947 to stop. The memory address in the counter 959 now is at the address of the axle which has left the bridge. It may be noted that the memory address counter is always at one count greater, referred to the positions of the axles on the bridge, than the axles per bridge counter during sub-routine R2/4.

In the sub-routine selector circuit 500, the R2/4 and the signal S1 enable the gates 512 and 517, with the output of the gate 517 being gated to the gate 521 to the inverter 522 to trigger the input gate of the oscillator 524. As described above, the oscillator 524 produces negative going output pulses which are coupled through the inverter 525 to the clock input of the flip-flops 526 and 527. The flip-flop 526 is clocked by this pulse to provide the LATCH signal to the latch 707 and the latch 713 of the processor instruction and data entry circuit 700. On the next clock pulse, the flip-flop 527 is clocked to provide the PROCESSOR ENABLE signal to the clock input of the flip-flop 727 of the processor 701. The flip-flop 727 is clocked to enable the MOS processor to receive the instruction data, as described above.

The sequence state advances to S2 and, as can be seen in Table II above, in this state the axle weight is transferred from the axle library 1001 to the MOS processor. At this time, the signal S2 to the input of the gate 721 is at a logic 0 and the output of the gate is driven to a logic 1. This logic 1 is coupled to the selector 706 to operate it to select the data on the input leads B, which date corresponds to the memory data from the axle library on the A inputs of the selector 705. This logic 1 from the output of the gate 721 also is coupled through the inverter 722 to provide a logic 0 input to the latch 713 to enable it for the data input.

The gates 512, 517 and 521 of the sub-routine selector circuit 500 are again enabled, in the manner described above, to trigger the oscillator 524 of the processor enable circuit 501 to produce the negative going output pulses to the flip-flops 526 and 527. The flip-flop 526 again is enabled to provide the LATCH output signal to the latch 707 and the latch 713, after which the flip-flop 527 is enabled to output the PROCESSOR ENABLE signal to the clock input of the flip-flop 727 of the processor 701. As can be seen in Table II above, since the MOS processor receives data serially, this process is repeated four times, by means of the gate 828 and the flip-flops 836 and 837 which function as a divide-by-four counter which controls the load control input to the main counter 814, in generaly the same fashion as the divide-by-five counter 840 during sub-routine R1, as described above.

Upon loading the axle weight from the axle library into the MOS processor, as in the manner described above, the sequence state advances to sequence state S3. As can be seen in Table II above, when the sequence state advances to sequence state S3, the operation is the same as described above as during sub-routine R1, during the sequence state S3 through S7.

Also, when the sequence state advances to sequence state S3, in the axle library controller 900, the S3 signal is inverted by the inverter 936 and coupled to the gate 942. Since R2/4 is true, the gate 942 is enabled to output a logic 0 to the gate 943 to drive its output high. This high is coupled through the inverter 944 to the counters 959 and 963 to operate them to reinstate the counts stored in the latches 960 and 965, respectively. That is the end of the sub-routine R2/4 operation.

Accordingly, it can be seen from the description above, that during sub-routine R2/4 the axle weight of the axle which left the weigh bridge is located in the axle library 1001 and transferred to the MOS processor wherein this axle weight is subtracted from the previous bridge weight stored in the MOS processor. Thereafter, the new previous bridge weight (the bridge weight remaining after the axle weight of the axle which left the weigh bridge is subtracted from the previous bridge weight) is subtracted from the current weight coupled into the MOS processor, from the input register 401. The determined weight corresponds to the axle weight of the axle which just entered the weigh bridge. This axle weight then is transferred during sub-routine R1 to the axle library 1001. Again, as described above, when the sequence state advances to sequence state S13, the MOS processor output is transferred to the output register 1000.

Sub-Routine 3

Sub-routine R3 is established when an axle leaves the weigh bridge. At this time, the MOS processor is cleared, a new weigh cycle is initiated and the current bridge weight is transferred to the current weight register of the MOS processor.

The axle leaving the weigh bridge is first detected by the closing of switch S4 which functions to close ground, at its contact 1, to the contact bounce removal circuit 301 which, in turn, outputs a logic 1 signal to the clock input of the flip-flop 308. The Q output of the flip-flop 308 goes to a logic 1 which is coupled to the input of the latch 304 and to the input of the flip-flop 309. When the axle actually leaves the weigh bridge, the track switch SW5 operates to close ground, at its contact 1, to the contact bounce removal circuit 301 and, again, a logic 1 is outputed to the clock input of the flip-flop 309. The flip-flop 309 is clocked to output a logic 1 on its Q output to the latch 304 and a logic 0 on its $\overline{Q}$ output to the input of the gate 307. This logic 0 coupled to the input of the gate 307 drives its output high to trigger the monostable 310 to provide a negative going pulse to the input of the gate 311. The output of the gate 311 goes high, which high is inverted by the inverter 321 and coupled to the inputs of the gates 313 and 314. These gates are enabled and the outputs $\overline{2}, \overline{3}, 5$ and 6 are selected, in the manner described above. These outputs trigger the gate 316 to provide a logic 0 output to the input of the gate 321 to drive its output high. The output of the gate 321 triggers the inverter 322 to couple a negative going pulse to the input of the monostable 406. The latter produces a negative going pulse on its $Q_n$ output lead to initiate the weigh cycle, as described above. The negative going pulse from the inverter 322 also triggers the monostable 407 to clock the flip-flops 408, 409, and 410 in the manner described above, to establish the routine within the stored routine selection and start computation circuit 404, in the manner described above. Upon receipt of the END WEIGH signal, the established routine is transferred to and decoded by the decoder 505 of the sub-routine selector circuit 500. The decimal input to the decoder 505 will be a decimal 3 and, as can be seen in Table I above, the decimal input establishes the sub-routine R3. The END WEIGH signal also triggers the monostable 419 to produce the START COMPUTATION signal which is coupled to the sequence state controller 800 to initiate its operation.

As can be seen in Table II above, during sub-routine R3, only the sequence states 14 and 15 are utilized. Accordingly, the sequence states merely advance through the sequence state S0 through S13 and, upon entering sequence state S4, the instruction CLEAR is entered into the MOS processor. This CLEAR instruction is entered into the MOS processor, by selecting the instruction on the A inputs of the selector 706, in the manner described above.

The sequence state advances to sequence state S15 and, at that time, the current weight registered in the input register 401 is transferred into the MOS processor, via the B inputs of the selector 705 and the B inputs of the selector 706. Again, as described above, the process of entering the current weight into the MOS processor is in a serial fashion, and the divide-by-five counter 840 of the sequence state controller 800 is utilized for this purpose.

The sequence state then advances to sequence state S0, indicating the end of sub-routine 3.

Sub-Routine R5

When the track switch logic indicates that a car or wagon is in full draft, sub-routine R5 is established. As can be seen in Tables I and II above, during routine 4, sub-routines R1, R3 and R5 are established. During the sequence states S3–S7, sub-routine R1, the current bridge weight is transferred to the MOS processor and the previous bridge weight subtracted to determine the axle weight of the axle which entered the weigh bridge. The axle weight then is transferred to the axle library. During sequence states 8 and 9, enabled during sub-routine R5, the foreign axle weights presuming there are foreign axles on the weigh bridge, are located in the axle library 1001 and subtracted from the current bridge weight in succession. During sequence state S13, the axle weight in the MOS processor is transferred to the output register 1000. During sequence states 14 and 15, sub-routine R3, the MOS processor is cleared and the current register weight is transferred to the MOS processor. A LAST AXLE is produced, at this time, by the detection circuit 11 (FIG. 1), and is coupled to the stored routine and start computation circuit 404.

More particularly, the detection circuit 11 (FIG. 1) detects the end of a car entering upon the weigh bridge WR and produces an output signal which is coupled as a LAST AXLE signal to the gates 416 and 417 of the stored routine selection and start computation circuit 404 to clock the flip-flop 418 so that a logic 1 is provided on its Q output to the input of the flip-flop 421. This logic 1 on the Q output of the flip-flop 418 also is coupled to the gates 411 and 412 of the routine modifier and enable computation circuit 402 and to the input of the monostable 620 of the select axle sum or full draft circuit 600. The monostable 620 is triggered when the LAST AXLE signal returns to logic 0 and produces an outgoing 0.5 microsecond negative pulse on its $Q_n$ lead to the input of the gate 621 to drive its output high to a logic 1. This logic 1 output from the gate 621 is coupled to the clear input of the counter 614 (the axles per car counter) to reset or clear it.

Before the counter 614 in the select axle sum or full draft circuit 600 is cleared, circuits 614, 615, 616, 617, 618 and 610 combine to provide a full draft signal on the output of gate 618. In the case when the count in counter 614, which indicates the axles per car, is less than the count in counter 615, the car is in full draft. The comparator 616 has a logic 0 on its output which with inverter 617, gate 619 and inverter 618 outputs a logic 1 to the input of flip-flop 408.

When the flip-flop 408 is clocked, the logic 1 on its Q output is coupled to the gate 411. Both inputs to the gate 411 now are high since the LAST AXLE signal is present and it outputs a logic 0 to the gate 413 to drive its output high. The $\overline{Q}$ output of the flip-flop 408 is at a logic 0 and is coupled to the input of the gate 412 to drive its output high. Both inputs of the gate 414 now are high, and its output goes to a logic 0. The logic 0 output of the gate 414 is coupled to the input of the flip-flop 422. Accordingly, at this time, when the END WEIGH pulse is received, the flip-flops 421, 422, and 423 are again clocked to couple the signals on their input leads (1, 0 and 0, respectively) through to their Q output leads to provide a decimal 4 input to the decoder 505 of the sub-routine selector circuit 500. The decimal coded input to the decoder 505 establishes the sub-routines R1, R3, and R5.

Once routine 4 is established and the sequence state controller 800 is activated, initially the operation is the same as described above as during sub-routine 1, during the sequence states S3 through S7. Upon entering the sequence state S8, the instruction SUBTRACT is entered into the MOS processor and the foreign axle weights are located in the axle library 1001 and subtracted from the current bridge weight in succession.

In particular, with reference to the processor instruction and data entry circuit 700, the signal S4 and the signal S15 at the input of the gate 714 both are at a logic 1 so that the gate 714 outputs a logic 0 to the selector 705 to select the data on its A inputs, i.e., the memory data from the axle library 1001. Also, all of the inputs to the gate 712 are at a logic 1, thus enabling this gate to output a logic 0 to the selector 706 to enable it to select the inputs on its A input leads which constitute the instruction data. S7 is at a logic 1, hence the A1 input to the selector 706 is at a logic 0. Since S8 is at a logic 0, the output of the gate 718 is driven high, and this high output is inverted by the inverter 717 to a logic 0 to the input of the gate 716, thus driving its output high. The logic 1 output of the gate 718 is also coupled to the A3 input of the selector 706. S5 is at a logic 1, and when inverted by the inverter 719, provides a logic 0 input to the A4 input of the selector 706. The A1-A4 inputs of the selector 706 have the input signals 0, 1, 1 and 0, respectively, which as can be seen in Table II, correspond to the instruction subtract which is to be entered into the MOS processor.

The latch 707 and the latch 713 are again set by means of the LATCH OUTPUT signal of the flip-flop 526 of the processor enable circuit 501, in the manner described above, and thereafter the PROCESSOR ENABLE signal is outputed from the flip-flop 527.

Simultaneously, during sequence state S8, the signal S8 which is at a logic 0 is coupled to the inverter 932 of the axle library controller 900. The inverter 932 inverts the logic 0 and couples a logic 1 to the input of the gate 933. Since R5 also is at a logic 1, this R5 input to the gate 933 enables it to output a logic 0 to the input of the gate 951 to drive its output high. This high is coupled to the one input of the gate 950. The logic 0 output of the gate 933 is also coupled to the input of the gate 952 to drive its output high. This high output or logic 1 also is coupled to the input of the gate 950. Since the signal S1 is at a logic 1, at this time, on being coupled to the inverter 934, a logic 0 is coupled to the input of the gate 935 to hold its output high. This logic 1 output of the gate 935 is coupled as an input to the gate 953. However, the other input of the gate 953 is at a logic 0 at this time, as explained more fully below, hence its output is at a logic 1. This logic 1 upon being coupled to the gate 950 enables the latter to output a logic 0 to the input of the gate 949 to drive its output high. The logic 1 output of the gate 949 is coupled to the input of the monostable 954 to trigger it to provide a positive going 0.125 microsecond pulse on its output to the latches 965 and 960 to transfer and to latch therein the counter states of the counters 963 and 959, respectively.

The logic 0 output of the gate 950 also is coupled to the input gate of the oscillator 947 to trigger it to output negative going pulses which cause the counters 959, 962 and 963 to down count until the counter 962 which is the axles per car or wagon counter is at 0. At this time, the output of the gate 961 goes to a logic 1 and, upon being coupled to the input of the gate 953, enables it to output a logic 0 to the input of the gate 950. This logic 0 drives the output of the gate 950 to a logic 1 to stop the oscillator 947. The axles per car or wagon counter 962 is now at 0 and the axles per bridge counter 963 is at the first foreign axle and the memory address counter 959 is at the address of the first axle after the leading axle of the wagon or car being weighed in full draft (the count in the memory address counter 959 need not be the same as the axles per bridge counter 963).

At this time, the sequence state advances to sequence state S9 in the manner described above. Again, as described above, during sub-routine R2, sequence state S2, the axle weight is transferred to the MOS processor, with the sequence state controller 800 being held at sequence state S9 four times. However, in this case, the signal S5 and R9 at the gate 829 of the sequence state controller 800 control the divide-by-four counter comprising the flip-flops 836 and 837.

At the end of the memory transfer to the MOS processor, the load control output, that is, the output of the inverter 847 of the sequence state controller 800, goes to a logic 1. This logic 1 is coupled to the input of the monostable 920 of the axle library controller 900 to trigger it. The signal S9 which occurred is coupled through the inverter 919 to the input of the gate 917 and with the inverted load control input which is high drives its output low to reset the latch comprising the gates 914 and 915 so that its output to the gate 916 goes to a logic 1. Since the R5 input to the gate 916 also is at a logic 1, the output pulse from the monostable 920 coupled to the input of the gate 916 enables the gate 916 to provide an output logic 0 which is the load 8 control signal to the gate 848 of the sequence state controller 800.

This load 8 signal drives the output of gate 848 to a logic 1 which feeds the selector 815 so that the inputs selected comes from selector 816. The selector 816 has the binary code of 8 set on the output since sub-routine R5 sets up 8 on input A and load 13 is at logic 0 and selects input A. The outputs of selector 815 feed the main counter 814 with the binary code for decimal 8 and since the load 8 signal of logic 0 passes through gates 848, 820, 819 and 818 to give a logic 0 at the load input of the main counter 814, on the next clock pulse from oscillator 810 steps the counter 814 back to position 8 and S8 is again selected.

As described above, the instruction SUBTRACT again is entered into the MOS processor and the next foreign axle weight is located in the axle library 1001. In the axle library controller 800, the oscillator 947 is not started since the axles per wagon or car counter 962 is at 0 and the output of the gate 961 therefore is at a logic 1 to the gate 953. With both inputs to the gate 953 being at a logic 1, its output is a logic 0 to the input of the gate 950 to hold its output high. The logic 1 at the output of the gate 950 prevents the oscillator 947 from starting. The logic 0 at the output of the gate 933, however, is coupled to and triggers the monostable 948 to provide a negative output pulse to the gate 956. The gate 956 is enabled since counter 962 is at zero and the output of gate 961 is logic 1 and provides a negative pulse to the input of the gate 957. At this time, the other two inputs of the gate 957 are at a logic 1 so that the positive pulse feeds gate 958 and hence a negative pulse on its output to step down the counter 959 by one count. Simultaneously, the output of the gate 956 is coupled to the counter 963 to step its count down by one. At this time, the memory address counter 959 is at the new memory address of the next foreign axle. The foreign axle weight then is transferred into the MOS processor in the fashion described above and subtracted from the current weight.

This action between sequence state S8 and S9 continues until all foreign axles are subtracted from the current bridge weight. On the last sequence state S8 signal, the counter 963 reaches 0 at which time, the output of the gate 964 goes to a logic 1. When the output of the gate 964 goes to a logic 1, all of the inputs to the gate 921 are at a logic 1 so that this gate is enabled to output a logic 0 to the input of the gate 923 to drive its output high. This high output from the gate 923 is the load 13 signal to the sequence state controller 800, and the main counter 814 jumps to sequence state S13 on the next clock pulse, in a similar manner described above for load 8 when the load control input of the main counter 814 is held low.

On entering sequence state S13, in the sequence state controller, the signal S13 is true and is coupled to the inverter 835 which inverts this signal to a logic 1. This logic 1 is coupled to the clock input of the flip-flop 1112 to clock the logic 1 on its input to its Q output to the gate 1110. On the next $\overline{D5}$ timing signal coupled through the inverter 1111 to the gate 1110, the latter's output goes to a logic 0. This logic 0 is inverted by the inverter 1109 and coupled to the clock input of the flip-flop 1106 to couple the logic 1 on its input to its Q output to the gate 1103 and to the gate 1116. On $\overline{D5}$ and the following $\overline{D4}$ to $\overline{D1}$ timing signals, the output of the MOS processor is gated into the respective registers 1002–1006 of the output register 1000.

The S13 signal also is coupled to the inverter 937 of the axle library controller 900 which inverts it and couples a logic 1 to the gate 941. Since R5 is at a logic 1, the output of the gate 940 is driven high. With both inputs to the gate 941 being high, its output goes low. This low is coupled to the input of the gate 943 to drive its output high. This high or logic 1 is inverted by the inverter 944 and coupled to the counters 959 and 963, and the latched counter states of these counters are reinserted from the latch circuits 960 and 965, respectively. This is the end of sub-routine R5.

Sub-Routine R6

Sub-routine R6 is established when the track switch logic indicates axle sum on the car. On receipt of the last axle signal, the axle weights of each of the axles of the car are located in the memory and added in the MOS processor in succession. Upon receipt of the end of axle per car signal, the current weight in the MOS processor is transferred to the output register 1000.

More particularly, when the last axle signal is received by the stored routine selection and start computation circuit 404, in the manner described above in connection with sub-routine R5 since the count of the counter 614 is greater than the count of the counter 615, the comparator 616 will output a logic 1. The axle sum/full draft signal from the gate 618 wil be at a logic 0, rather than at a logic 1 as in the previously described example during full draft operation. When the END WEIGH signal is received, the gates 421, 422, and 423 are again clocked to couple the selected stored routine into the decoder 505 to establish the routine 5 operation. As can be seen in Table I above, the sub-routines R1, R3 and R6 are established.

The operation therefore proceeds as during sub-routine R1 described above, during sequence states S3–S7. During this sub-routine, the axle weight of the axle which has just entered the weigh bridge is determined and then entered into the axle library 1001. After completing the sub-routine R1 operation, the sequence state controller 800 advances through sequence states S8 and S9, with no effect on the operation of the circuit.

Upon entering sequence state S10, the instruction CLEAR AXLE SUM is entered into the MOS processor via the A inputs of the selector 706, in the manner described above, to clear the MOS processor. Also, in the axle library controller 900, the signal S10 is coupled through the inverter 931 to couple a logic 1 to the input of the gate 930. The signal R6 also is at a logic 1 to the input of the gate 930 so that the gate 930 is enabled to provide a logic 0 on its output to the input of the gate 929 and to the input of the gate 949. The output of the gate 929 is driven high to enable the gate 928 to latch its output at a logic 0. The logic 0 input to the gate 949 drives its output high, and this logic 1 is coupled to the monostable 954 to trigger it to provide a positive going output pulse to the latches 960 and 965 to latch the counter states of the counter 959 and 963 into them, respectively. At this time, the memory address counter 959 is at the address of the last axle position.

The sequence state now advances to sequence state S11, and the instruction ADD is entered into the MOS processor via the A input leads to the selector 706, in the manner described above. Also, in the axle library controller 900, the M11 signal is coupled to the input of the gate 906 to enable it to latch the output of the gate 907 at a logic 1, and to the gate 926 after being inverted by the inverter 927. The output of the gate 926 is high, due to the latched output from gate 928.

The sequence state now advances to sequence state S12 and the axle weight is transferred from the axle library 1001 to the MOS processor via the selectors 705 and 706. The signal S12 is coupled to the input of the gate 928 to enable this latch to set the output of the gate 928 at a logic 1. The S12 signal also is coupled through the inverter 910 to the input of the gate 909 as a logic 0 and the output of gate 907 is latched to a logic 1.

At the end of the memory transfer to MOS processor, the LOAD CONTROL signal, that is, the output of the inverter 847 of the sequence state controller 800 goes to a logic 1 and, again, it is coupled to the input of the monostable 920. The monostable 920 produces a four millisecond pulse which is coupled to the input of the gates 916 and 908. This pulse becomes the load 11 pulse to the sequence state controller 800 and, at the end of sequence state S12, the next main counter clock pulse sets the sequence state to S11 again, in a manner similar to the operation described above with respect to the load 8 operation.

In sequence state S11, the gate 926 of the axle library controller 900 is enabled and all of its inputs at this time are at a logic 1 so that its output is a logic 0 to the input of the monostable 955. The latter produces a negative going pulse which is coupled to the counters 959 and 962, to count down the count of these counters by one.

The sequence state again advances to sequence state S12, and as before, the axle weight is transferred from the axle library 1001 into the MOS processor. This action between states 11 and 12 continues until all of the axle weights have been transferred into the MOS processor, at which time the counter 962 will be at 0 and the output of the gate 961 goes to a logic 1. Wheb the output of the gate 961 goes to a logic 1, the load 13 signal again is generated, as described above, so that the main counter 814 jumps to sequence state S13 on the next clock pulse.

In sequence state S13, the output of the MOS processor is transferred to the output register 1000, in the manner described above. The signal S13 again is coupled through the inverter 937 to the input of the gate 941. The output of the gate 941 at this time is at a logic 0 and is coupled to the input of the gate 943 to drive its output high. This high, as before, is inverted by the inverter 944 and coupled to the counters 959 and 963, to again transfer the count stored in the latches 960 and 965 back into the counters. Also, the S13 and R6 signals are coupled to the gate 925 to force the counter 962 from the 0 state and remove the load 13 signal to the sequence state controller 800. This is the end of the sub-routine R6 operation.

The sequence state advances to sequence state S14, and the instruction CLEAR is entered into the MOS processor to clear it. The sequence state then advances to sequence state S15, and the current weight in the input register 401 is transferred to the MOS processor via the selectors 705 and 706. The sequence state is stepped five times at S15 by the operation of the divide-by-five counter 840, in the manner described above, to transfer this data.

The sequence state then advances to sequence state S0, and stops. The routines or decimal numbers which feed the sub-routine selector as stated previously will select sub-routines determined by Table I. The routine selection circuit 300 generates these decimal numbers. Decimal numbers 1, 2, 3, 4 and 5 were generated to cover the selection of sub-routines R1-R6. The generation of decimal numbers 6 and 7 in the routine selection circuit 300 is covered below and for completeness the associated sub-routines are briefly discussed.

Routine 6 (Decimal Input 6)

This operation is established when the track switch logic indicates that a car is in full draft, as during subroutine R5 above, and that an axle is about to leave the weigh bridge as the last axle of a car enters. In this case, the operation of the track switches SW is such that the gate 315 outputs a logic 1 to the gate 323. The output of the gate 316 is high and the output of gate 323 is low and feeds a low to the input of flip-flop 409. The output of gate 318 goes low when the axle leaves the bridge, thus the output of the gate 319 goes high. This high is inverted by the inverter 320 and coupled as a low to the gate 324 to drive its output high. This high is coupled to the input of the flip-flop 410. In the select axle sum or full draft circuit 600, the count of the counter 614 will be equal to or less than the count of the counter 615 so that the comparator 616 outputs a logic 0 indicating full draft condition. After passing through the inverter 617 and the gates 619 and 618, a logic 1 is outputted to the input of the flip-flop 408.

Accordingly, now when the flip-flops 408–410 are clocked by the monostable 407, in the manner described above, the logic 1 on the input of the flip-flop 408 is coupled to its Q output to the gate 411. Since the LAST AXLE signal now is true, both inputs to the gate 411 are high and its output is a logic 0. This logic 0 is coupled to the input of the gate 413 driving its output high. This high is coupled to the one input of the gate 414. The $\overline{Q}$ output of the flip-flop 408 is low, thus the output of the gate 412 is driven high and is coupled to the input of the gate 414. Both inputs to the gate 414 now are high so that its output goes low, and this low or logic 0 is coupled to the input of the flip-flop 422. With the input to the flip-flop 410 being at a logic 1, when this flip-flop is clocked, its $\overline{Q}$ output is at a logic 0. This logic 0 is inverted by the inverter 415 and coupled to the input of the flip-flop 423 as a logic 1. Also, since the LAST AXLE signal is true, the flip-flop 418 is clocked and the logic 1 on its input is coupled to its Q output to the input of the flip-flop 421. When these flip-flops are clocked by the ENABLE COMPUTATION signal, after receipt of the END WEIGH signal, these flip-flops output a decimal 6 input to the decoder 505 which decodes this input and, as can be seen in Table I above, the sub-routines R1, R2/4, R3 and R5 all are established.

As can be seen in Table II above, since the sub-routine R2 has been established, upon entering sequence state S1, the instruction SUBTRACT is entered into the MOS processor and the axle library controller 900 is operated to locate the axle which left the weigh bridge. The sequence state then advances to sequence state S2, and the axle weight of the axle which left the weigh bridge is transferred to the MOS processor and subtracted from the previous bridge weight.

When the sequence state advances to sequence state S3, the operation proceeds as described above during sub-routine R1. During the sub-routine R1, the current weight in the input register 401 is transferred into the MOS processor, and the new previous bridge weight stored therein is subtracted from the current bridge weight to determine the weight of the axle which entered the weigh bridge. This axle weight then is transferred to the axle library 1001, all in the manner described above during sub-routine R1.

Upon entering sequence state S8, the operation now proceeds as described above during sub-routine R5. At this time, all of the foreign axle weights are subtracted from the current bridge weight so that after subtracting all of these foreign axles, the weight in the current register of the MOS processor corresponds to the weight of the car in full draft.

At the end of sequence state S9, the sequence state jumps to sequence state S13 and the output of the MOS processor is transferred to the output register 1000. The sequence state then advances to sequence state S14 and the MOS processor is cleared. On advancing to sequence state S15, the current weight is transferred from the input register 401 to the MOS processor, ending routine 6 operation.

Routine 7 (Decimal 7 Input)

Routine 7, or decimal 7 input, operation is established when the track switch logic indicates that the last axle of a car has entered the bridge, as during routine 5 above, and that an axle is about to leave but all the axles of the car are not on the bridge. In this case, the operation of the track switches SW is such that, ultimately the flip-flops 408–410 and 421–423 output a decimal 7 input to the decoder 505, when the flip-flops 408–410 are clocked by the monostable 407 and the flip-flops 421–423 by the ENABLE COMPUTATION signal.

In particular, the operation of the track switches SW is such that the outputs of gates 315, 316 and 317 are high and the output of gate 318 goes low when the last axle leaves the weigh bridge. The input to flip-flop 410 is logic 1 and the input to flip-flop 409 is logic 0. In the select axle sum or full draft circuit 600, the count of the counter 614 is greater than the count of the counter 615 so that the comparator 616 outputs a logic 1 indicating an axle sum condition. After passing through gates 617, 619 and 618 a logic 0 is outputed to the input of flip-flop 408. The pulse from monostable 407 clocks a logic 1 to the $\overline{Q}$ output of flip-flop 408 and the two inputs to gate 412 are at logic 1. Gate 412 goes to logic 0 and the output of gate 414 to logic 1 which feeds the input of flip-flop 422 with a logic 1. Decimal 7 is therefore fed to the decoded 505 when the ENABLE COMPUTATION signal is generated. The decoder upon decoding the decimal 7 input, establishes sub-routines R1, R2/4, R3 and R6, as can be seen in Table I above. Again, upon entering sequence state S1, since sub-routine R2/4 is established, the axle weight of the axle which left the weigh bridge is located in the axle library 1001, transferred to the MOS processor, and subtracted from the previous bridge weight stored therein.

Upon entering sequence state S3, the current bridge weight in the input register 401 is transferred to the MOS processor and subtracted from the new previous bridge weight to determine the axle weight of the axle which entered the weigh bridge. This axle weight is then transferred to the axle library 1001.

Upon entering sequence state S10, the MOS processor is cleared ready for axle sum and, thereafter, the axle weights of each of the axles of the car are located in the axle library 1001 and transferred, successively, into the MOS processor and added.

The sequence state advances to sequence state S13 and the axle sum in the MOS processor is transferred to the output register 1000. The sequence state then advances to sequence state S14, the MOS processor cleared, and then upon advancing to sequence state S15, the current weight is transferred from the input register 401 to the MOS processor. This concludes the operation, during routine 7.

Marginal Overspeed

Figure 14:
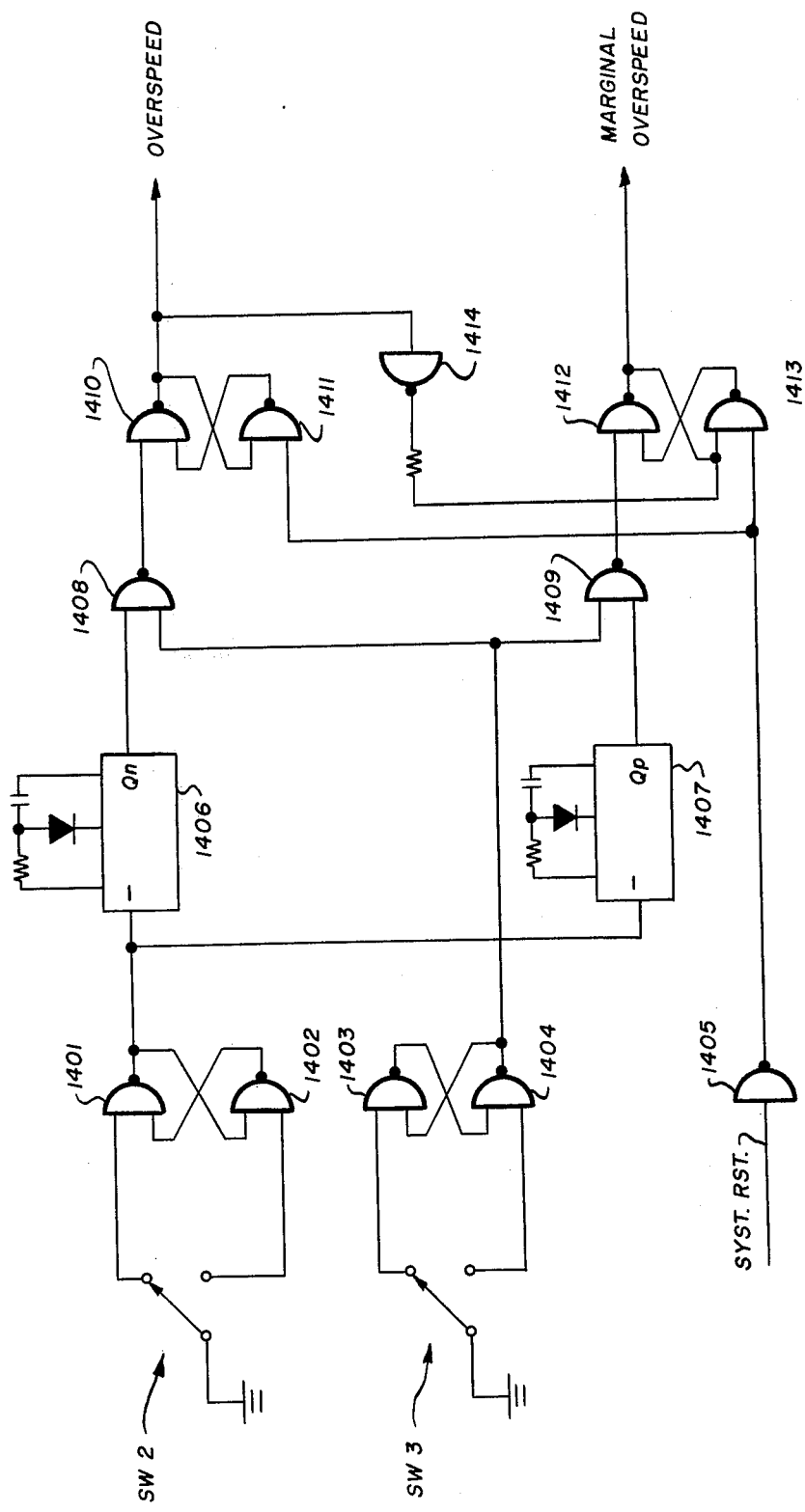
FIG. 14 is a block diagram schematic of the marginal overspeed and overspeed control circuitry.

As in the case of the disclosure of U.S. Pat. No. 3,374,844, provision is made for a marginal overspeed signal to advise the engineer of the train that the train should at least go no faster for effective weighing of the cars, and for error overspeed to warn the engineer that the train is traveling too fast for effective weighing. With reference to FIGS. 1 and 14, in the instant case, the track switches SW2 and SW3 provide the overspeed and marginal overspeed signals. Normally, the contacts of track switches SW2 and SW3 couple ground to the input of the latches 1401, 1402 and 1403, 1404, respectively, so that the output of the gate 1401 is latched at a logic 1 and the output of the gate 1404 is latched to a logic 0. Also, the system reset input to the gate 1405 when operated is at a logic 1, the logic 0 output of the gate 1405 on being coupled to the input of the gate 1411 and 1413, drives the output of each of these gates high and thus the outputs of the gates 1410 and 1412 low, so that a logic 0 normally is outputed on the overspeed and the marginal overspeed output leads.

The monostables 1406 and 1407 both of which may be of a type SN74123N are established such as to provide a short pulse and a long pulse, respectively, which are related to the maximum allowable train speed, as described more fully below.

The operation generally is such that when track switch SW2 has operated, if track switch SW3 is closed during an established time interval after the closure of the track switch SW2, the marginal overspeed output goes to a logic 1. If the time between the closure of the track switch SW2 and SW3 is such that overspeed is indicated, the overspeed output lead will go to a logic 1 and, simultaneously, will reset the marginal overspeed.

More particularly, when track switch SW2 operates ground is coupled to the input of the gate 1402 to drive its output high and the output of gate 1401 low. This low or logic 0 triggers both of the monostables 1406 and 1407 to provide a positive going pulse on their respective $Q_p$ output leads. Track switch SW3 now closes. Ground is coupled to the input of the gate 1404 to drive its output high, and this high or logic 1 is coupled to the input of both of the gates 1408 and 1409. Assuming that the train speed is within an allowable range, the positive pulse output from the monostable 1407 will have already disappeared so that the gate 1409 is not triggered to a logic 0. The shorter pulse from the multivibrator 1406 of course, already has disappeared, so that the gate 1408 likewise is not enabled to provide a logic 0 on its output. Accordingly, both the marginal overspeed and the overspeed outputs remain the same, at a logic 0.

However, assume that the track switch SW3 is operated and the logic 1 is coupled to the gate 1409 during the presence of the long pulse from the monostable 1407. Both inputs to the gate 1409 will be high so that the gate 1409 is enabled to provide a logic 0 output to the gate 1412 driving its output high. This high or logic 1 output signal on the marginal overspeed lead can be utilized in the manner described in the above-identified U.S. Pat. No. 3,374,884, to light a yellow warning lamp and to intermittently operate a horn, to provide a signal that at least marginal overspeed of the train cars has been reached.

Correspondingly, if track switch SW3 is closed and the logic 1 is coupled to the gate 1408 during the occurrence of the short pulse from the monostable 1406, both inputs of the gate 1408 will be high thus enabling it to provide a logic 0 output to the gate 1410, to drive its output high. Again, this high on the overspeed lead can be utilized to energize the horn to provide a steady audible output and to operate a flashing red lamp, to thereby warn the train engineer both audibly and visually that the train is traveling too fast for effective weighing.

The logic 1 output on the overspeed lead also is coupled to the input of the gate 1414, and the output of this gate which is a logic 0 is coupled to the input of the gate 1413 and also to the marginal overspeed lead to override and to inhibit the marginal overspeed signal.

The system reset pulse is provided to re-establish the original system conditions, once the marginal or overspeed conditions have been corrected.

Print Out

Normally, during sequence state S13, the output of the inverter 835 (a logic 1 corresponding to $\overline{S13}$) is coupled to the gate 435. The Q output of the gate 421 also is coupled to the gate 435 so that upon receipt of the LAST AXLE signal, both inputs to the gate 435 are at a logic 1 and its output goes low for the duration of S13. This low is inverted to a high by the inverter 436 and coupled to the gate 437. The Q output of the flip-flop 439 is high at this time, and is coupled to the input of the gate 437 driving its output low. This low is inverted by the inverter 438 to provide a positive pulse of duration $\overline{S13}$ on the PRINT COMMAND lead, to initiate a print out of the data coupled into the output register 1000. Accordingly, a print out is provided for each car weight.

If the link 440 is opened, a print out will be provided for each axle weight, upon the occurrence of the $\overline{S13}$ signal to the gate 435.

Locomotive Print Out Inhibit

As in U.S. Pat. No. 3,374,844, provision also can be made to eliminate the print out of the locomotive weight. In eliminating the locomotive weight, the fact that each truck of a locomotive has at least one axle located at least 6 feet away from all other axles is utilized. A typical locomotive with two axles per truck may be assumed, the two axles being more than 6 feet apart, and with more than 6 feet between the rear axle of the front truck and the front axle of the rear truck. With this assumption, the operation resulting from the locomotive passing the weight bridge is as follows.

Referring now to FIG. 1a, when the front axle of the front truck of the locomotive approaches the weigh bridge, track switch SW1 is momentarily operated, momentarily operating relay R1. Relay R2 responsively operates and locks to ground at back contact 3 of relay R4. Next, track switch SW2 is operated, causing relay R3 to operate, and at its contact 1, locks to ground at the back contact 1 of restored relay R1. Relays R2 and R3 are thus both now lock operated.

Before relay R1 is next operated to release locked relay R3 (in view of the noted inter-axle spacing, more than 6 feet), the associated front axle wheel momentarily closes track switch SW3 and thus operates relay R4. The back contact 3 of relay R4 opens the initial locking circuit of relay R2, but that relay remains lock operated through contacts 4 and 2 of relays R3 and R2, respectively. With relays R2, R3 and R4 concurrently operated, relay R5 operates through contacts 1 of relay R2, contacts 2 of relay R3, and contacts 1 of relay R4. At contacts 1, relay R5 locks operated to ground at contacts 1 of relay R12 and at its contacts 3, it functions to couple GND or a logic 0 to the input of the flip-flop 439. This flip-flop 439 is clocked by the ENABLE COMPUTATION signal to couple a logic 0 to its Q output to the gate 437. Accordingly, at this time, when the LAST AXLE signal is received, the output of the gate 437 remains high. Upon being inverted by the inverter 438, the PRINT COMMAND is inhibited, thus eliminating the print out of the locomotive weight.

This action continues for each truck of the locomotive until the track SW operations for a car as described in U.S. Pat. No. 3,374,844 outputs a logic 1 to the input of flip-flop 439 and the output of flip-flop 439 is clocked to a logic 1.

The foregoing operations responsive to the passage of the front truck of the locomotive are repeated for the passage of the rear truck of the locomotive over the weigh bridge, whereby relay R5 acts again as described.

It will thus be seen that the objects set forth above among those made apparent from the preceding description, are efficiently attained and certain changes may be made in carrying out the above method and in the construction set forth. Accordingly, it is intended that all matter contained in the above description or shown in the accompanying drawings shall be interpreted as illustrative and not in a limiting sense.

Now that the invention has been described, what is claimed as new and desired to be secured by Letters Patent is:

1. A method of measuring the loading of a series of axle configurations of a vehicle comprising the steps of:
   moving the vehicle onto a weigh platform having a length to admit said series of axle configurations,
   recording the total weight on the platform at the time of entry thereon or exit therefrom of each axle configuration,
   and subtracting from the total weight as just aforesaid the total weight on the platform at the time of entry thereon or exit therefrom of the next preceding axle configuration.

2. A method of measuring the loading of a series of axle configurations of a vehicle as claimed in claim 1 including
   recording in addition the total weight on the platform at the time of entry or exit of the last axle configuration in the series.

3. A method for weighing railroad cars of varying lengths while in motion and while coupled together as the railroad cars pass over a weigh bridge having a weigh system comprising the steps of determining the axle weight of each axle as said axles enter upon said weigh bridge, storing the individual axle weights of each of said axles, and associating and adding together the individual axle weights of all of the axles of a railroad car to thereby provide the total weight of the railroad car, further including the steps of storing the previous bridge weight, determining the current bridge weight each time an axle enters upon said weigh bridge, and subtracting the previous bridge weight from the current bridge weight to thereby provide the axle weight of an axle entering upon said weigh bridge.

4. The method of claim 3, further including the step of transferring the current bridge weight into storage as the previous bridge weight each time after the axle weight of an axle has been determined.

5. The method of claim 3, further comprising the steps of providing a last axle signal each time the last axle of a railroad car enters upon said weigh bridge, retrieving the individual axle weights of the axles of a railroad car from storage when said last axle signal is present, and adding together the individual axle weights to provide the total weight of that railroad car.

6. The method of claim 3, further including the steps of retrieving the axle weight of an axle which left said weigh bridge from storage, subtracting said axle weight from the previous bridge weight to thereby provide a new previous bridge weight which is subsequently subtracted from the current bridge weight to determine the axle weight of the next axle entering upon said weigh bridge.

7. The method of claim 3, further including the steps of delaying a weigh cycle when an axle is about to enter said weigh bridge when an axle is about to leave until the axle leaves said weigh bridge, retrieving the axle weight of the axle which left the weigh bridge from storage, subtracting the axle weight from the previous bridge weight to provide a new previous bridge weight, and then subtracting the new previous bridge weight from the current weight when the axle enters upon said weigh bridge to determine the axle weight of the axle which entered upon said weigh bridge.

8. The method of claim 3, further including the steps of providing a last axle signal each time the last axle of a railroad car enters upon said weigh bridge, providing a full draft signal when a railroad car is in full draft with all of its axles on said weigh bridge, determining and storing the axle weight of the last axle of the railroad car, clearing the previous bridge weight from storage, and storing the current bridge weight to thereby provide the full draft weight of a railroad car in full draft on the weigh bridge.

9. The method of claim 8, further including the steps of determining any foreign axles on said weigh bridge together with a railroad car in full draft, retrieving from storage the axle weights of each foreign axle and subtracting the same from the current bridge weight.

10. The method of claim 9, further including the steps of retrieving from storage the axle weight of an axle which leaves said weigh bridge while a railroad car is in full draft on said weigh bridge, subtracting the axle weight of the axle which left from the previous bridge weight to thereby provide a new previous bridge weight, subtracting the new previous bridge weight from the current weight to provide the axle weight of the last axle which entered said weigh bridge, storing said last axle weight.

11. A method of measuring the loading of a series of axle configurations of a truck comprising the steps of
   moving the truck onto a weigh platform having a length to admit said series of axle configurations,
   recording the total weight on the platform at the time of entry thereon of each axle configuration,
   and subtracting from the total weight as just aforesaid the total weight on the platform at the time of entry thereon of the next preceding axle configuration.

12. A method of measuring the loading of a series of axle configurations of a truck as claimed in claim 11 including
   recording in addition the total weight on the platform at the time of entry of the last axle configuration in the series.

13. A method of measuring the loading of a series of axle configurations of a vehicle comprising the steps of:
   moving the vehicle onto a weigh platform having a length to admit said series of axle configurations,
   recording the total weight on the platform at the time of entry thereon of each axle configuration,
   and subtracting from the total weight as just aforesaid the total weight on the platform at the time of entry thereon, of the next preceding axle configuration.

14. A method of measuring the loading of a series of axle configurations of a vehicle as claimed in claim 13 including recording in addition the total weight on the platform at the time of entry of the last axle configuration in the series.

15. In combination with a weigh bridge and a weigh system for providing the weight on the weigh bridge at given times, apparatus for weighing railroad cars of varying length while in motion and while coupled together comprising: a current weight register, the current bridge weight being determined by said weigh system each time an axle enters upon said weigh bridge and stored in said current weight register; a previous weight register in which the previous bridge weight is stored; a memory for storing the weight of each of said axles as said axles enter upon said weigh bridge; processor means operated each time an axle enters upon said weigh bridge to subtract the previous bridge weight stored in said previous weight register from the current bridge weight stored in said current weight register to thereby provide the axle weight of the axle which entered upon said weigh bridge; the axle weight of each of said axle being transferred into storage in said memory.

16. The apparatus of claim 15, wherein the current bridge weight is transferred as the previous bridge into storage in said previous weight register each time the axle weight of an axle which entered upon said weigh bridge has been determined.

17. The apparatus of claim 16, wherein an axle sum routine is established when the last axle of a railroad car enters upon said weigh bridge, the axle weights of each of the axles of a railroad car being retrieved from said memory and transferred to said processor means, said processor means adding together each of said axle weights to thereby provide a summation of axle weights to provide the total weight of a railroad car.

18. The apparatus of claim 16, wherein an axle sum routine is established when the last axle of a railroad car enters upon said weigh bridge, the axle weight of said last axle being determined by said processor means subtracting the previous bridge weight stored in said previous weight register from the current bridge weight stored in said current weight register, the last axle weight being transferred for storage in said memory, the axle weights of each of the axles of said railroad car thereafter being retrieved from said memory and transferred to said processor means, said processor means adding together each of said axle weights to thereby provide a summation of axle weights to provide the total weight of said railroad car.

19. The apparatus of claim 18, further comprising an output register, the summation of axle weights being transferred from said processor means to said output register, whereby a print-out of the summation of axle weights of the railroad cars can be subsequently provided.

20. The apparatus of claim 18, wherein the axle weight of an axle leaving said weigh bridge during an axle sum routine is retrieved from said memory, transferred to said processor means and subtracted by the latter from the previous bridge weight stored in said previous weight register to provide a new previous bridge weight, the current bridge weight being transferred to said processor means and the latter operating to subtract therefrom said new previous bridge weight to thereby provide the axle weight of the axle entering upon said weigh bridge, said axle weight being transferred into storage in said memory, the axle weights of each of the axles of said railroad car thereafter being retrieved from said memory, transferred to said processor means and added together by said processor means to provide a summation of axle weights to provide the total weight of a railroad car.

21. The apparatus of claim 20, further including an output register, the axle sum of a railroad car being transferred from said processor means to said output register and a subsequent print-out of the axle sum stored therein being provided to thereby provide a record of the axle sum of the railroad car.

22. The apparatus of claim 15, wherein the axle weight of an axle which left said weigh bridge is retrieved from said memory and transferred to said processor means, said processor means subtracting said axle weight from the previous bridge weight stored in said previous weight register to thereby provide a new previous bridge weight, said new previous bridge weight being transferred into said previous weight register for subsequent use in determining the axle weight of another axle entering upon said weigh bridge.

23. The apparatus of claim 15, wherein a full draft routine is established when a railroad car is in full draft with all of its axles on said weigh bridge, said processor means being cleared and the current weight in said current weight register being transferred to said processor means, to thereby provide the full draft weight of that railroad car.

24. The apparatus of claim 15 wherein a full draft routine is established when the last axle of a railroad car enters upon said weigh bridge and said car is in full draft with all of its axles on said weigh bridge, the axle weight of said last axle being determined by said processor means subtracting the previous bridge weight stored in said previous weight register from the current bridge weight stored in said current weight register, the axle weight of said last axle being transferred into storage in said memory, said processor means thereafter being cleared and the current weight stored in said current weight register being transferred to said processor means to thereby provide the full draft weight of said railroad car.

25. The apparatus of claim 15, wherein the axle weight of each foreign axle on said weigh bridge together with the axles of a railroad car in full draft is retrieved from said memory and transferred to said processor means, said processor means subtracting the axle weight of each foreign axle from the current weight in said processor means, whereby the full draft weight of only the railroad car in full draft on said weigh bridge is provided.

26. The apparatus of claim 21, further including an output register, the full draft weight of said railroad car being transferred from said processor means to said output register and a subsequent print-out of full draft weight stored therein being provided to thereby provide a record of the full draft weight of the railroad car.

27. The apparatus of claim 15, wherein the axle weight of an axle leaving said weigh bridge during a full draft routine is retrieved from said memory, transferred to said processor means and subtracted by the latter from the previous bridge weight stored in said previous weight register to provide a new previous bridge weight, the current bridge weight being transferred to said processor means and the latter operating to subtract therefrom said new previous bridge weight to thereby provide the axle weight of said last axle, the axle weight of said last axle being transferred into storage in said memory, said processor means thereafter being cleared and the current bridge weight stored in said current weight register being transferred to said processor means to thereby provide the full draft weight of said railroad car.

28. The apparatus of claim 15, wherein the determination of the axle weight of an axle entering upon said weigh bridge is delayed when an axle is leaving said weigh bridge, the axle weight of the axle leaving said weigh bridge being retrieved from said memory and transferred to said processor means, said processor means subtracting said axle weight from the previous bridge weight stored in said previous weight register to thereby provide a new previous bridge weight, said new previous bridge weight being transferred into said previous weight register, said processor means being operated when said axle enters upon said weigh bridge to subtract the new previous bridge weight from the current bridge weight stored in said current weight register to thereby provide the axle weight of the axle which entered upon said weigh bridge.

29. The apparatus of claim 15, further comprising track logic means for providing signals indicating when an axle enters or leaves or is about to enter or leave said weigh bridge, means operated in response to said signals from said track logic means to initiate a weigh cycle for determining the axle weight of each individual axle as said axles enter upon said weigh bridge.

30. The apparatus of claim 29, wherein said track logic means comprises a plurality of track switches positioned with respect to said weigh bridge to be actuated to provide an output signal when an axle enters or leaves or is about to enter or to leave said weigh bridge, two of said track switches being positioned at the entrance gap to and the exit gap of said weigh bridge, respectively, another of said track switches being positioned from each of said track switches at the entrance and exit gaps a distance equal to or less than one-half of the minimum axle spacing between any two adjacent axles of the railroad cars to be weighed.

31. The apparatus of claim 29, further comprising means operated by said track logic means to inhibit the weighing of locomotives.

32. In combination with a weigh bridge and a weigh system for providing the weight on the weigh bridge at given times, apparatus for weighing railroad cars of varying lengths while in motion and while coupled together comprising: a current weight register, the current bridge weight being determined each time an axle enters upon said weigh bridge and stored in said current weight register; a memory for storing the weight of each of said axles as said axles enter upon said weigh bridge; processor means including a previous weight register in which the previous bridge weight is stored for subtracting the previous bridge weight from the current bridge weight each time an axle enters said weigh bridge to provide the axle weight of each of said axles, the current bridge weight being transferred into storage in said previous weight register after each axle weight determination and the axle weights of each of said axles being transferred into storage in said memory; a last axle indicating means for providing a last axle signal each time the last axle of a railroad car enters upon said weigh bridge; and means responsive to said last axle signal operated after the axle weight of the last axle has been determined and transferred into storage in said memory to retrieve from said memory the axle weights of each of the axles of that railroad car and to transfer said axle weights to said processor means, said processor means being operated to add together each of said axle weights to provide the axle sum of all of said axles of said railroad car to thereby provide the total weight of said railroad car.

33. The apparatus of claim 32, further including an output register, the axle sum being transferred from said processor means to said output register, whereby a print-out of the axle sum stored therein can be subsequently provided.

34. The apparatus of claim 32, further including means for indicating when a railroad car is in full draft on said weigh bridge; and means operated after the axle weight of the last axle has been determined and transferred into storage in said memory in response to said last axle indicating means and said full draft indicating means to clear said previous weight register of said processor means and to transfer thereto the current bridge weight stored in said current weight register to thereby provide the full draft weight of the railroad car in full draft on said weigh bridge.

35. The apparatus of claim 5, further including an output register, the full draft weight being transferred from said processor means to said output register, whereby a print-out of the full draft weight stored therein can be subsequently provided.

36. The apparatus of claim 32, further including track logic means for providing signals indicating when an axle enters and leaves said weigh bridge; means responsive to said track logic means for indicating the number of axles on said weigh bridge and for providing signals indicating an axle sum routine and a full draft routine; means operated after the axle weight of a last axle of a railroad car has been determined and transferred into storage in said memory in response to said last axle signal and said axle sum routine signal to retrieve from said memory the axle weights of each of the axles of that railroad car and to transfer said axle weights to said processor means, said processor means being operated to add together each of said axle weights to provide the axle sum of all of said axles of said railroad car to thereby provide the total weight of said railroad car.

37. The apparatus of claim 7, further including means operated after the axle weight of a last axle of a railroad car has been determined and transferred into storage in said memory in response to said last axle signal and said full draft routine signal to clear said previous weight register in said processor means and to transfer thereto the current bridge weight stored in said current weight register, whereby the full draft weight of the railroad car in full draft on said weigh bridge is provided.

38. The apparatus of claim 8, wherein said means responsive to said track logic means is operated to automatically establish one of said axle sum routine and said full draft routine each time said last axle signal is present.

39. The apparatus of claim 9, further comprising an output register, the axle sum and full draft weights being transferred from said processor means to said output register, whereby a print-out of the axle sum and full draft weights of the railroad cars can be subsequently provided.

40. The apparatus of claim 32, further comprising track logic means including track switch means for indicating when an axle enters or leaves or is about to enter or to leave said weigh bridge and routine selection means operated responsive to said track switch means to establish one of a plurality of routine modes of operation in accordance with the sequence of operation of said track switch means, and means operated in response to the operation of said routine selection means in establishing a routine mode of operation to initiate a weigh cycle, the current bridge weight during said weigh cycle being determined by said weigh system and transferred into storage in said current weight register.

41. The apparatus of claim 11, wherein said routine selection means further is operated to delay the initiation of said weigh cycle in response to a signal from said track logic means indicating that an axle is about to leave said weigh bridge when an axle is about to enter said weigh bridge until said axle leaves said weigh bridge and to initiate a routine mode of operation during which the axle weight of the axle which left said weigh bridge is retrieved from said memory, transferred to said processor means, subtracted from said previous bridge weight to provide a new previous bridge weight and said new previous bridge weight is transferred into storage in said previous weight register.

42. The apparatus of claim 11, further including means responsive to said track logic means for indicating the number of axles on said weigh bridge and for providing signals indicating an axle sum routine during which the axle weights of all of the axles of a railroad car are retrieved from said memory and added together to provide an axle summation of the total weight of the car and a full draft routine during which the full draft weight of a railroad car is provided by clearing the previous weight register and transferring thereto the current bridge weight stored in said current weight register, said routine selection means further being responsive to said last axle signal to establish said axle sum routine when axle sum signal is present and to establish said full draft routine when said full draft signal is present.

43. The apparatus of claim 41, further comprising an output register, the axle sum and full draft weights being transferred from said processor means to said output register, whereby a print-out of the axle sum and full draft weights of the railroad cars can be subsequently provided.

44. The apparatus of claim 43, further comprising routine selected storage means for storing the routine mode of operation established by said routine selection means and for initiating the computation of an axle weight and the axle sum or full draft weight of a railroad car in accordance with the established routine mode of operation.

45. The apparatus of claim 44, further comprising sub-routine selection means coupled with and operated in response to the established routine mode of operation stored in said routine selected storage means to establish sub-routine modes of operation during which the various steps in the computation of an axle weight of an axle and the axle sum and full draft weight of a railroad car are initiated and performed.

46. The apparatus of claim 16, further comprising sequence state controller means for providing a plurality of sequence state signals, each representative of an established sequence state, and means operated in response to said sequence state signals and signals representative of the established sub-routine modes of operation to enable said processor means and to couple instructions and data to said processor means to determine the axle weight of an axle or the axle sum or full draft weight of a railroad car.

47. A truck weigh scale comprising
a weigh platform for a truck;
a weigh scale for said weigh platform;
detector means for truck axles on said platform;
axle configuration selector means responsive to predetermined programming for arranging the axles of a truck in a series of predetermined axle configurations as its axles are detected by said detector means; and
weight register means responsive to said axle configuration selector means to register weight on said weigh scale,
said weight register means comprising a first memory register for weight on said weigh platform having an updating time base, a logic control, a calculating network, a data interface and an information recorder, said logic control being responsive to said axle configuration selector means to operate said calculating network to accept the weight information in said first memory register upon the operation of said logic control, said time base being less than the time between entry of succeeding axle configurations in use, a second memory register adapted to accept and record the weight information transferred to said calculating network when said calculating network is operated by said logic control for use by said calculating network at the next following time of operation of said logic control, said calculating network being adapted to calculate the difference between the weight information on said memory registers at the time of operation of said logic control and transmit it to said data interface for use by said information recorder.

48. A truck weigh scale comprising a weigh platform for a truck having a length to receive a series of truck axle configurations,
a weigh scale for said weigh platform with an output,
a first register means connected to said output of said weigh scale;
a second register means connected to the output of said weigh scale with a memory,
a logic control operable upon the entry of each successive axle configuration to said weigh platform,
a calculating network,
a data interface,
said calculating network being responsive to operation of said logic control to register the total weight on said weigh platform on said first registr means at the time of operation of said logic control, calculate the difference between the total weight on said weigh platform at the next preceding time of operation of said logic control and the time of operation of said logic control, communicate the said difference to a data interface for use and transfer the total weight at the time of operation of said logic control to said second register means.

49. A vehicle weigh scale comprising
a weigh platform for a vehicle;
a weigh scale for said weigh platform;
detector means for vehicle axles on said platform;
axle configuration selector means responsive to predetermined programming for arranging the axles of a vehicle in a series of predetermined axle configurations as its axles are detected by said detector means; and
weight register means responsive to said axle configuration selector means to register weight on said weigh scale, said weight register means comprising a first memory register for weight on said weigh platform having an updating time base, a logic control, a calculating network, a data interface and an information recorder, said logic control being responsive to said axle configuration selector means to operate said calculating network to accept the weight information in said first memory register upon the operation of said logic control, said time base being less than the time between entry of succeeding axle configurations in use, a second memory register adapted to accept and record the weight information transferred to said calculating network when said calculating network is operated by said logic control for use by said calculating network at the next following time of operation of said logic control, said calculating network being adapted to calculate the difference between the weight information on said memory registers at the time of operation of said logic control and transmit it to said data interface for use by said information recorder.

50. A vehicle weigh scale comprising a weigh platform for a vehicle having a length to receive a series of truck axle configurations,
a weigh scale for said weigh platform with an output,
a first register means connected to said output of said weigh scale;
a second register means connected to the output of said weigh scale with a memory,
a logic control operable upon the entry of each successive axle configuration to said weigh platform,
a calculating network,
a data interface,
said calculating network being responsive to operation of said logic control to register the total weight on said weigh platform on said first register means at the time of operation of said logic control, calculate the difference between the total weight on said weigh platform at the next preceding time of operation of said logic control and the time of operation of said logic control, communicate the said difference to a data interface for use and transfer the total weight at the time of operation of said logic control to said second register means.

51. In combination with a weigh bridge and a weigh system for providing the weight on the weigh bridge at given times, apparatus for weighing vehicles of varying length while in motion comprising: a current weight register, the current bridge weight being determined by said weigh system each time an axle enters or leaves said weigh bridge and stored in said current weight register; a previous weight register in which the previous bridge weight is stored; a memory for storing the weight of each of said axles as said axles enter or leave said weigh bridge; processor means operated each time an axle enters or leaves said weigh bridge to subtract the previous bridge weight stored in said previous weight register from the current bridge weight stored in said current weight register to thereby provide the axle weight of the axle which entered or left said weigh bridge.

* * * * *